(12) United States Patent
Amemiya

(10) Patent No.: US 11,394,648 B2
(45) Date of Patent: Jul. 19, 2022

(54) INFORMATION PROCESSING APPARATUS AND INFORMATION PROCESSING METHOD

(71) Applicant: FUJITSU LIMITED, Kawasaki (JP)

(72) Inventor: Kouichirou Amemiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/161,230

(22) Filed: Jan. 28, 2021

(65) Prior Publication Data

US 2021/0258259 A1    Aug. 19, 2021

(30) Foreign Application Priority Data

Feb. 18, 2020   (JP) .............................. JP2020-025353

(51) Int. Cl.
| | |
|---|---|
| H04L 47/10 | (2022.01) |
| H04L 47/28 | (2022.01) |
| H04L 43/0852 | (2022.01) |
| H04L 47/2416 | (2022.01) |
| H04L 67/1095 | (2022.01) |
| H04L 47/2425 | (2022.01) |
| H04L 45/24 | (2022.01) |

(52) U.S. Cl.
CPC .......... *H04L 47/10* (2013.01); *H04L 43/0858* (2013.01); *H04L 45/245* (2013.01); *H04L 47/2416* (2013.01); *H04L 47/2433* (2013.01); *H04L 47/28* (2013.01); *H04L 67/1095* (2013.01)

(58) Field of Classification Search
CPC . H04L 45/245; H04L 67/126; H04L 41/0823; H04L 43/026; H04L 43/028; H04L 67/1095; H04L 47/283; H04L 47/10; H04L 47/2433; H04L 47/2458; H04L 67/125
See application file for complete search history.

(56) References Cited

U.S. PATENT DOCUMENTS

| | | | |
|---|---|---|---|
| 2004/0001493 A1* | 1/2004 | Cloonan | H04L 47/2433 370/395.42 |
| 2015/0339229 A1 | 11/2015 | Zhang et al. | |
| 2016/0373294 A1* | 12/2016 | Srivastav | H04L 45/245 |
| 2018/0091387 A1* | 3/2018 | Levi | H04L 67/1095 |

FOREIGN PATENT DOCUMENTS

| | | |
|---|---|---|
| JP | 2015-222477 A | 12/2015 |
| JP | 2017-515215 A | 6/2017 |
| WO | WO 2015/153259 A1 | 10/2015 |

\* cited by examiner

*Primary Examiner* — Kyung H Shin
(74) *Attorney, Agent, or Firm* — Staas & Halsey LLP

(57) ABSTRACT

A non-transitory computer-readable recording medium has stored therein a program that causes a computer to execute a process, the process comprising: detecting a target data flow in a data flow group when receiving the data flow group and performing a merging process of the data flow group, the data flow group including a plurality of data flows processed at respective bases, the target data flow having a delay time that satisfies a predetermined condition; and executing rearrangement of a generation element of the target data flow to an environment such that differences between delay times of the plurality of data flows are reduced.

11 Claims, 45 Drawing Sheets

FIG. 8

| BN-ID | WRITE DELAY | READ DELAY |
|---|---|---|
| BN#1 | 10ms | 10ms |

| SOURCE NODE ID | DESTINATION NODE ID | NETWORK DELAY |
|---|---|---|
| BN#1 | DSPN#1 | 10ms |
| BN#1 | BN#2 | 5ms |
| DSPN#2 | DSPN#3 | 5ms |

| STREAM PROCESSING FLOW ID | DATA/STREAM PROCESSING ID | DATA/STREAM PROCESSING ARRANGEMENT DESTINATION INFORMATION |
|---|---|---|
| Stream#1 | IN1 | BN#1 |
| Stream#1 | IN2 | BN#2 |
| Stream#1 | IN3 | BN#3 |
| Stream#1 | P1 | DSPN#1 |
| Stream#1 | P2 | DSPN#2 |
| Stream#1 | P3 | DSPN#3 |
| Stream#1 | P4 | DSPN#4 |
| Stream#1 | OUT1 | DSPN#4 |

T5

FIG. 13
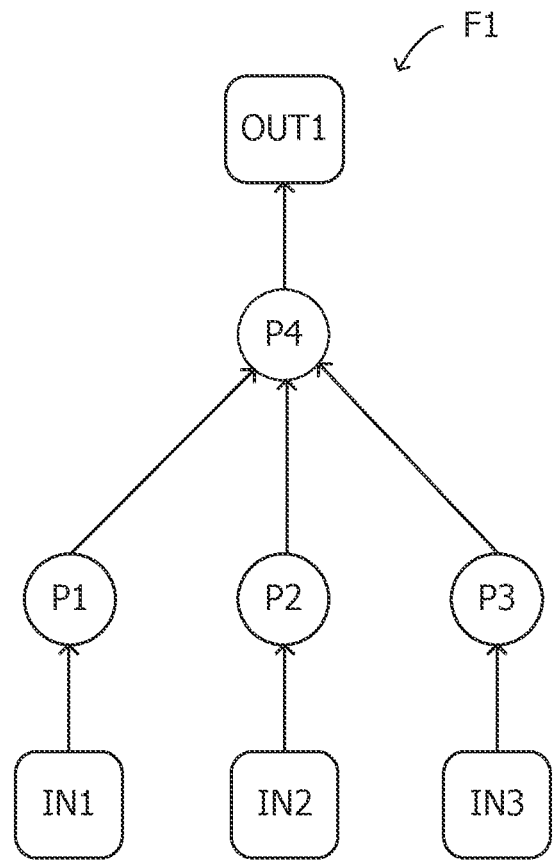
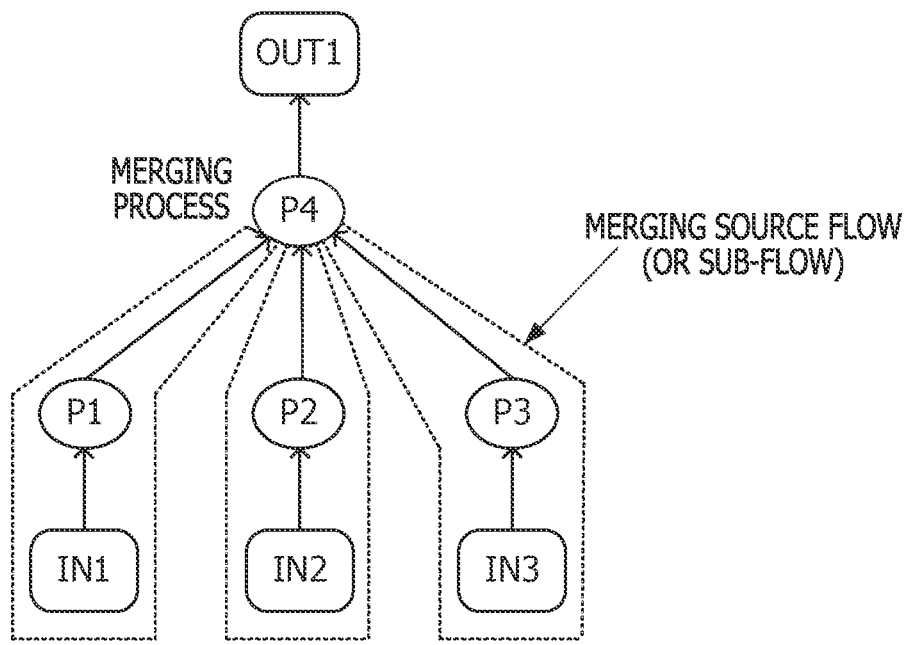

FIG. 14

| FIELD | VALUE |
|---|---|
| DESTINATION ADDRESS | ADDRESS OF INFORMATION PROCESSING SERVER |
| SOURCE ADDRESS | ADDRESS OF EDGE SERVER OF INFORMATION SOURCE |
| BN-ID | ID IDENTIFYING BN |
| WRITE DELAY | WRITE DELAY IN BN |
| READ DELAY | READ DELAY IN BN | m1

FIG. 15

| FIELD | VALUE |
|---|---|
| DESTINATION ADDRESS | ADDRESS OF INFORMATION PROCESSING SERVER |
| SOURCE ADDRESS | ADDRESS OF EDGE SERVER OF INFORMATION SOURCE |
| DSPN-ID | ID IDENTIFYING DSPN |
| DSPN PROCESSING DELAY | PROCESSING DELYA IN DSPN | m2

FIG. 16

| FIELD | VALUE |
|---|---|
| DESTINATION ADDRESS | ADDRESS OF INFORMATION PROCESSING SERVER |
| SOURCE ADDRESS | ADDRESS OF EDGE SERVER OF INFORMATION SOURCE |
| SOURCE NODE ID | ID IDENTIFYING BN/DSPN |
| DESTINATION NODE ID | ID IDENTIFYING BN/DSPN |
| NETWORK DELAY | NETWORK DELAY BETWEEN SOURCE NODE AND DESTINATION NODE | m3

FIG. 17

| FIELD | VALUE |
|---|---|
| DESTINATION ADDRESS | ADDRESS OF DESTINATION BN |
| SOURCE ADDRESS | ADDRESS OF INFORMATION PROCESSING SERVER |
| BN-ID | ID IDENTIFYING BN |
| TOPIC | TOPIC NAME OF ARRANGEMENT CONTROL TARGET |
| PARTITION | PARTITION ID OF ARRANGEMENT CONTROL TARGET |
| METHOD | DESIGNATE ONE OF 1: ARRANGEMENT AND 2: DELETION | m4

FIG. 18

| FIELD | VALUE |
|---|---|
| DESTINATION ADDRESS | ADDRESS OF RECEPTION DSPN |
| SOURCE ADDRESS | ADDRESS OF INFORMATION PROCESSING SERVE |
| DSPN-ID | ID IDENTIFYING DSPN |
| STREAM PROCESSING FLOW ID | ID IDENTIFYING STREAM PROCESSING FLOW |
| MERGING SOURCE FLOW ID | ID IDENTIFYING MERGING SOURCE FLOW WHICH IS CONTROL TARGET IN PART OF STREAM PROCESSING FLOW |
| METHOD | DESIGNATE ONE OF 1: ARRANGEMENT, 2: DELETION, AND 3: SETTING OF DATA RECEPTION WINDOW SIZE |
| PARAMETER | DESIGNATE DATA RECEPTION WINDOW WHEN METHOD = 3 |

FIG. 35

| STREAM PROCESSING FLOW ID | PROCESSING TOPOLOGY | CONTROL MASTER ID | CONTROL MASTER ADDRESS |
|---|---|---|---|
| Stream#1 | IN1→P1、IN2→P2、IN3→P3、P1→P4、P2→P4、P3→P4、P4→OUT1 | EDGE#1 | EDGE ADDRESS |

| FIELD | VALUE |
|---|---|
| DESTINATION ADDRESS | ADDRESS OF DESTINATION EDGE |
| SOURCE ADDRESS | ADDRESS OF SOURCE EDGER |
| STREAM PROCESSING FLOW ID | ID IDENTIFYING STREAM PROCESSING FLOW |
| METHOD | DESIGNATE ONE OF 1: EDGE ID ADVERTISEMENT 2: ADVERTISEMENT RESPONSE AND 3: CONTROL MASTER ADVERTISEMENT |
| PARAMETER | METHOD=1: EDGE ID METHOD=2: ADVERTISEMENT SOURCE ID, RESPONSE SOURCE EDGE ID, RESPONSE METHOD=3: CONTROL MASTER ID, CONTROL MASTER EDGE ADDRESS |

INFORMATION PROCESSING APPARATUS AND INFORMATION PROCESSING METHOD

CROSS-REFERENCE TO RELATED APPLICATION

This application is based upon and claims the benefit of the prior Japanese Patent Application No. 2020-025353, filed on Feb. 18, 2020, the entire contents of which are incorporated herein by reference.

FIELD

The embodiments discussed herein are related to an information processing apparatus and an information processing method.

BACKGROUND

With the progress of IoT (Internet of Things) in recent years, there is an increasing demand for services in which event data provided by various devices installed in the fields (factories, social infrastructures, homes, etc.) is collected and utilized.

A stream processing is a technique that meets the demand for such services, and processes a large amount of data flowing in from an edge base in a field in real time and provides the processing results to a service user.

For example, in a stream processing of an automatic driving system, data output from vehicles, such as speed, position, and the like, is collected and analyzed, and danger information, which is the analysis result, is fed back to a driver. The application of stream processing is expected in order to improve services in the fields that require a real-time processing of data that continues to occur at such a high frequency.

As a related technique of stream processing, for example, when a candidate node satisfies a division criterion, a technique for distributing a subset of a new entry and a specific entry to a plurality of nodes by using a bit sequence acquired for each entry has been proposed. In addition, a technique for assigning jobs by selecting a calculation node in which the distribution of processing delay time is reduced has been proposed.

Related techniques are disclosed in, for example, Japanese National Publication of International Patent Application No. 2017-515215 and Japanese Laid-open Patent Publication No. 2015-222477.

SUMMARY

According to an aspect of the embodiments, a non-transitory computer-readable recording medium has stored therein a program that causes a computer to execute a process, the process comprising: detecting a target data flow in a data flow group when receiving the data flow group and performing a merging process of the data flow group, the data flow group including a plurality of data flows processed at respective bases, the target data flow having a delay time that satisfies a predetermined condition; and executing rearrangement of a generation element of the target data flow to an environment such that differences between delay times of the plurality of data flows are reduced.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

According to an aspect of the embodiments, an increase in memory occupancy time may be suppressed.

BRIEF DESCRIPTION OF DRAWINGS

FIG. 8 is a diagram illustrating an example of a BN (broker node) performance information table;

FIG. 10 is a diagram illustrating an example of a DSPN-BN delay information table;

FIG. 12 is a diagram illustrating an example of a stream processing arrangement destination information table;

FIG. 13 is a diagram illustrating an example of a stream processing flow;

FIG. 14 is a diagram illustrating an example of BN performance information;

FIG. 15 is a diagram illustrating an example of DSPN performance information;

FIG. 16 is a diagram illustrating an example of network delay information;

FIG. 17 is a diagram illustrating an example of data arrangement control information;

FIG. 18 is a diagram illustrating an example of processing execution control information;

FIG. 35 is a diagram illustrating an example of a stream processing flow definition information table;

FIG. 36 is a diagram illustrating an example of control master selection information;

DESCRIPTION OF EMBODIMENTS

When data may not be received and processed only by an edge base that covers a field due to the increase in data from the same field, a distribution stream processing is performed for distributing the processing to other edge bases and merging the distributed data at each edge base on the cloud side.

However, in the distribution stream processing, the arrival time at the data merging point varies due to the influence of network delay, transmission of data from edge bases with different loads, etc.

When performing the merging process, a memory is occupied until all the predetermined data arrives, but when there is data with a large arrival delay difference, there is a problem that the memory occupancy time of data arrived earlier (merging waiting data) increases, which is inefficient.

Hereinafter, embodiments will be described with reference to the accompanying drawings.

First Embodiment

Figure 1:
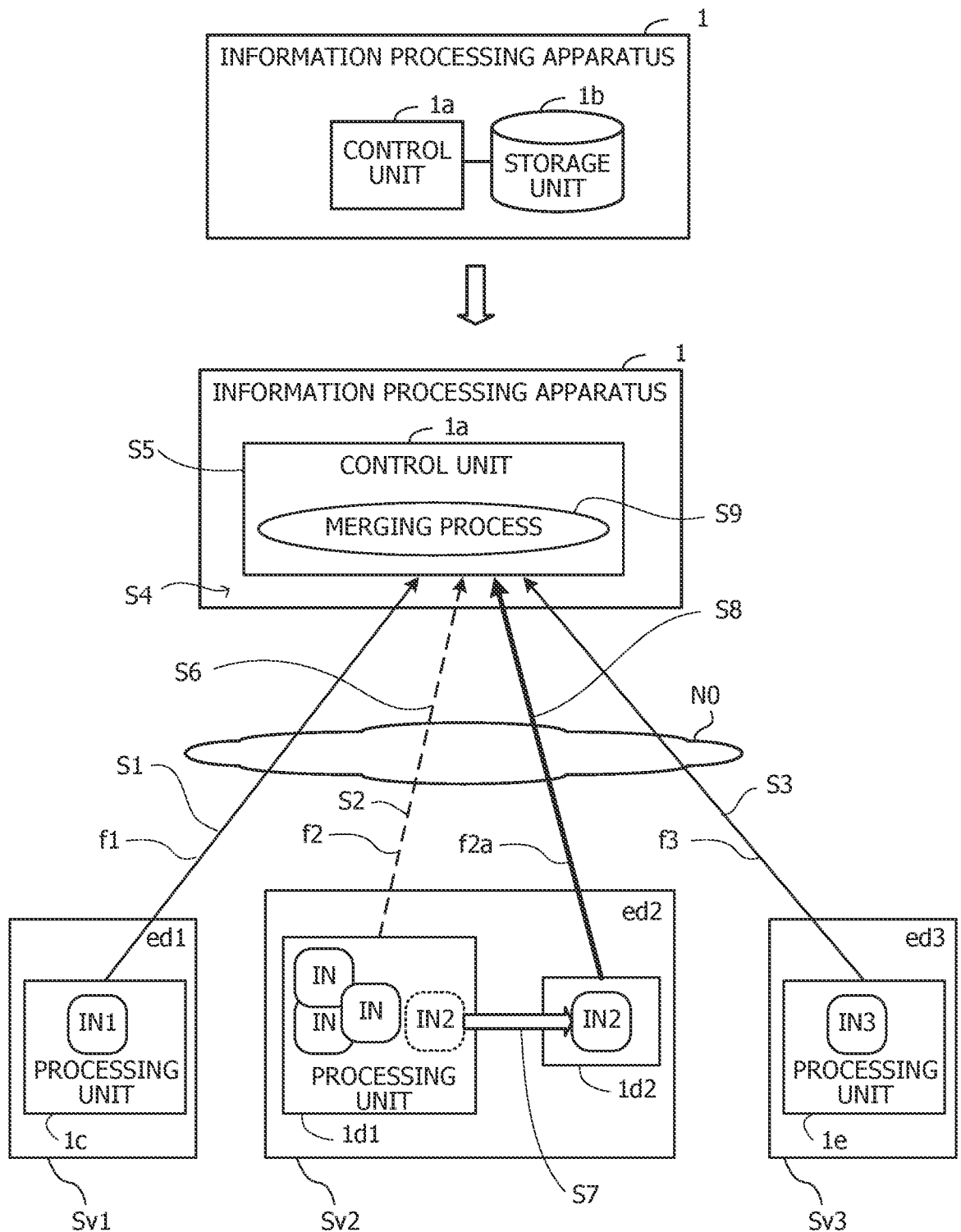
FIG. 1 is a diagram for explaining an example of an information processing apparatus.

A first embodiment will be described with reference to FIG. 1. FIG. 1 is a diagram for explaining an example of an information processing apparatus. The information processing apparatus 1 of the first embodiment includes a control unit 1a and a storage unit 1b.

When receiving a data flow group including a data flow processed at each base and performing a merging process on the data flow group, the control unit 1a detects a target data flow having an arrival delay difference larger than a predetermined value among the data flow groups. Then, the control unit 1a executes a process of rearranging a generation element of the target data flow in an environment where the arrival delay difference may be reduced.

Meanwhile, the generation element of the data flow refers to input data for which a data flow is generated, or data that is the unit of read/write processing when performing data processing (data parallel processing). For example, when a process P is executed on input data IN and a result thereof is transmitted as a data flow, a generation element of the data flow becomes the input data IN or the process P (data on which the process P is executed).

The storage unit 1b is a memory that stores a received data flow. Further, the storage unit 1b stores information related to the arrival time and operation control of a plurality of data flows, and the like. The function of the control unit 1a is implemented when a processor (not illustrated) included in the information processing apparatus 1 executes a predetermined program.

An operation of the information processing apparatus 1 will be described using the example of FIG. 1. An edge server sv1 is located at an edge base ed1, an edge server sv2 is located at an edge base ed2, and an edge server sv3 is located at an edge base ed3. The information processing apparatus 1 is connected to the edge servers sv1, sv2, and sv3 via a network N0.

[Step S1] The edge server sv1 located at the edge base ed1 performs a process on input data IN1 in a processing unit 1c and transmits the processing result as a data flow f1 to the information processing apparatus 1. The input data IN1 is a generation element of the data flow f1.

[Step S2] The edge server sv2 located at the edge base ed2 performs a process on input data IN2 in a processing unit 1d1 and transmits the processing result as a data flow f2 to the information processing apparatus 1. The input data IN2 is a generation element of the data flow f2.

[Step S3] The edge server sv3 located at the edge base ed3 performs a process on input data IN3 in a processing unit 1e and transmits the processing result as a data flow f3 to the information processing apparatus 1. The input data IN3 is a generation element of the data flow f3.

[Step S4] The control unit 1a receives the data flows f1, f2, and f3.

[Step S5] The control unit 1a obtains the delay time of the data flow f1, the delay time of the data flow f2, and the delay time of the data flow f3.

[Step S6] The control unit 1a detects a data flow (target data flow) having an arrival delay difference larger than a predetermined value based on the obtained delay times. It is assumed that the data flow f2 is the data flow having an arrival delay difference larger than a predetermined value. The control when detecting the data flow having an arrival delay difference larger than a predetermined value will be described later.

[Step S7] The control unit 1a rearranges the generation element of the data flow f2 from the currently located first location to a second location where the arrival delay difference may be reduced. In this example, in the processing unit 1d1 in the edge server sv2, in addition to the input data IN2 which is the generation element that generates the data flow f2, there are many processes of other input data IN, and the processing unit 1d1 has a high load. In response to such a state, for example, the input data IN2 is rearranged from the processing unit 1d1 (first location) to a low-load processing unit 1d2 (second location) by rearrangement control by the control unit 1a.

[Step S8] The edge server sv2 performs a process on the input data IN2 in the processing unit 1d2 and transmits the processing result as a data flow f2a to the information processing apparatus 1.

[Step S9] The control unit 1a receives the data flows f1, f2a, and f3 and performs a merging process on the data flows f1, f2a, and f3.

In this way, in the information processing apparatus 1, the generation element of the data flow having an arrival delay difference larger than a predetermined value among the data flow groups including the plurality of data flows is rearranged from the current location to another location where the arrival delay difference may be reduced, and the merging process is performed on the data flow. As a result, since the information processing apparatus 1 may reduce the arrival time variation at the data merging point, it is possible to suppress the increase in the memory occupancy time of the merging waiting data. In the above, the example of the rearrangement between different processing units in the same edge server is illustrated, but it is also possible to rearrange between different edge servers.

Second Embodiment

Next, descriptions will be made on a second embodiment in which the function of the information processing apparatus 1 is applied to a distribution stream processing system. First, the configuration of the distribution stream processing system will be described.

<Distribution Stream Processing System>

Figure 2:
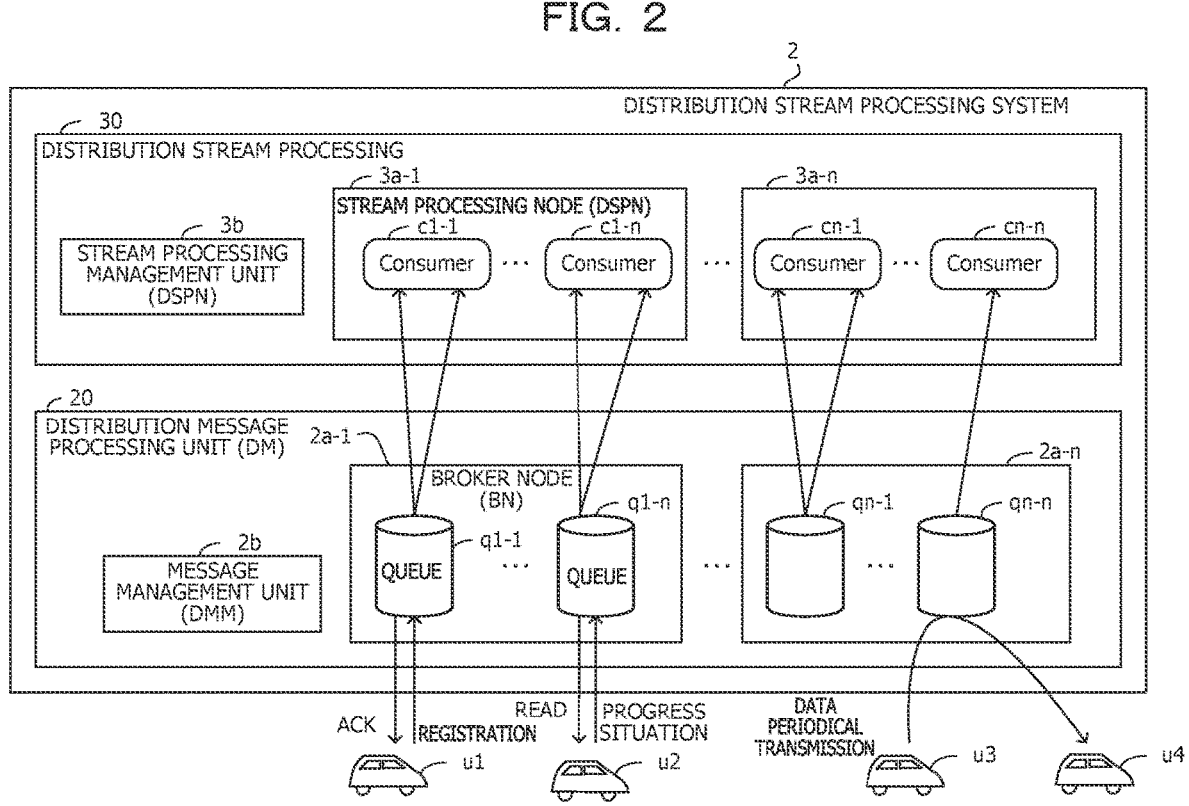
FIG. 2 is a diagram illustrating an example of a distribution stream processing system.

FIG. 2 is a diagram illustrating an example of a distribution stream processing system. The distribution stream processing system (DSPS) 2 is a system that collects and processes a large amount of data (event data), and includes a distribution message processing unit (DM) 20 and a distribution stream processing unit (DSP) 30.

The DM 20 has a function of receiving and accumulating a large amount of data from a field and includes broker nodes (BNs) 2a-1, ..., 2a-n and a message management unit (DMM) 2b.

The DSP 30 has a function of acquiring and processing data from the DM 20 and delivering the data to a service/application, and includes stream processing nodes (DSPNs) 3a-1, ..., 3a-n and a stream processing management unit (DSPM) 3b.

In the DM 20, the broker nodes are composed of a plurality of BNs 2a-1, ..., 2a-n and have guaranteed scalability. Further, the BNs 2a-1, ..., 2a-n has a plurality of queues. In the example of FIG. 2, the BN 2a-1 includes queues q1-1, ..., q1-n, and the BN 2a-n includes queues qn-1, ..., qn-n.

These queues are generated for each data topic (Topic: an attribute value indicating the type of data). In addition, the data stored in the queues is divided by a partition to implement a parallel read/write. The partition corresponds to the generation element of data flow described in FIG. 1.

The BNs 2a-1, ..., 2a-n accumulate data transmitted from data providers. The accumulated data are read out by data users or the DSPNs 3a-1, ..., 3a-n.

For example, when a data provider u1 registers data in the BN 2a-1, the BN 2a-1 returns an ACK to the data provider u1. A data user u2 inquires of the BN 2a-1 about the progress situation of data registration and reads out the data.

Alternatively, when receiving data periodically transmitted from a data provider u3, the BN 2a-n periodically transmits the data to a data user u4. Further, the BNs 2a-1, ..., 2a-n also transmit the accumulated data to the DSPNs 3a-1, ..., 3a-n.

The DMM 2b manages partition positions, data read progression, etc. for such data queuing of the BNs 2a-1, ..., 2a-n.

In the DSP 30, the DSPNs 3a-1, ..., 3a-n includes a plurality of consumers that process data read from the BNs 2a-1, ..., 2a-n. In the example of FIG. 2, the DSPN 3a-1 includes consumers c1-1, ..., c1-n, and the DSPN 3a-n includes consumers cn-1, ..., cn-n. The DSPM 3b controls the activation and arrangement of consumers. Data processed by the consumers are transmitted to, for example, a cloud.

<DSPS in Edge Environment>

Figure 3:
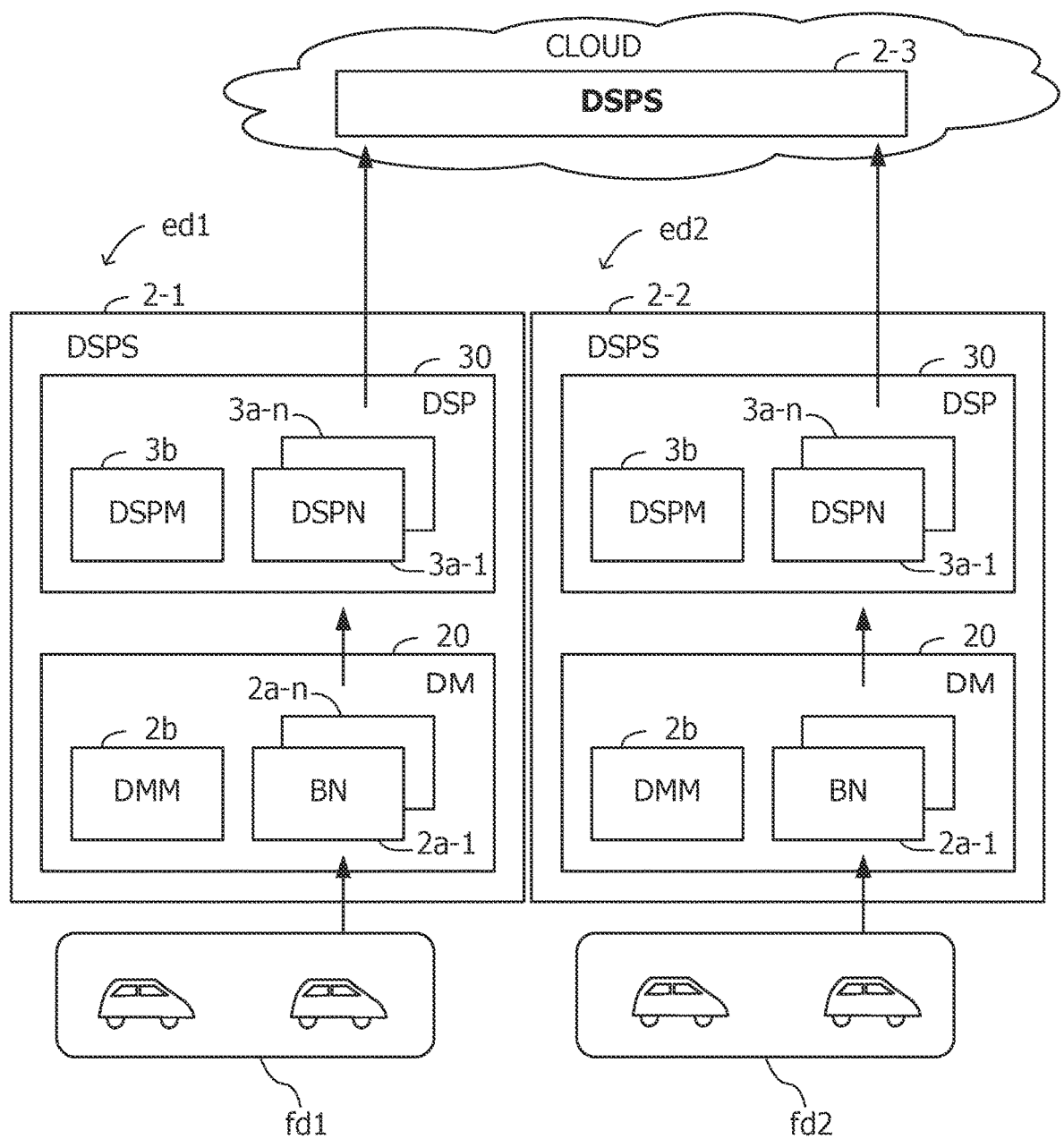
FIG. 3 is a diagram illustrating an example of a DSPS (distribution stream processing system) arranged in an edge base and a cloud.

FIG. 3 is a diagram illustrating an example of DSPS arranged at an edge base and a cloud. The DSPS is arranged at an edge base provided for each fixed area of a field to collect and process data. The edge base is, for example, a base directly connected to a mobile base station connected wirelessly, or a base that aggregates traffics from the mobile base station.

In the example of FIG. 3, a DSPS 2-1 is arranged at the edge base ed1 that covers a field fd1, and a DSPS 2-2 is arranged at the edge base ed2 that covers a field fd2. In addition, a DSPS 2-3 is further arranged in the upper-level cloud environment of the DSPSs 2-1 and 2-2.

Data uploaded from the field fd1 is transmitted to the DSPS 2-1 located at the edge base ed1 that covers the same field area, and the data collected by the DSPS 2-1 is transmitted to the DSPS 2-3 in the cloud environment.

Similarly, data uploaded from the field fd2 is transmitted to DSPS 2-2 located at the edge base ed2 that covers the same field area, and the data collected by DSPS 2-2 is transmitted to DSPS 2-3 in the cloud environment.

<Topic and Partition>

Figure 4:
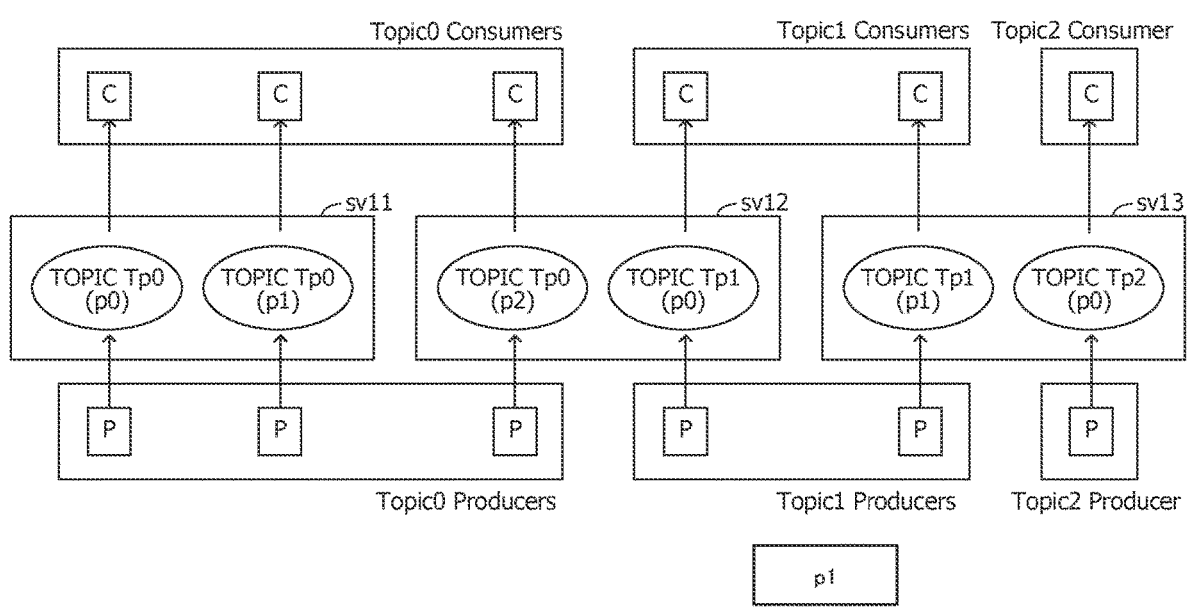
FIG. 4 is a diagram illustrating an example of upload of data divided by topic and partition.

FIG. 4 is a diagram illustrating an example of upload of data divided by topic and partition. Edge servers sv11, sv12, and sv13 that perform a DM function are arranged at edge bases, respectively. As described above, the topic indicates an attribute of data, and the partition is the unit of reading/writing topic data.

In the example of FIG. 4, data providers (Topic0 Producers) transmit data of a topic Tp0, data providers (Topic1 Producers) transmit data of a topic Tp1, and a data provider (Topic2 Producer) transmits data of a topic Tp2.

The data of the topic Tp0 is divided into the units of partitions p0, p1, and p2, and the data of the topic Tp1 is divided into the units of partitions p0 and p1. It is assumed that the data of the topic Tp2 has the unit of partition p0.

The edge server sv11 collects data of the partitions p0 and p1 in the data of the topic Tp0. Then, the edge server sv11 transmits the collected data of the topic Tp0 (the partition p0) and data of the topic Tp0 (the partition p1) to consumers (Topic0 Consumers) that perform a process of the topic Tp0.

The edge server sv12 collects data of the partition p2 in the data of the topic Tp0 and data of the partition p0 in the topic Tp1. Then, the edge server sv12 transmits the collected data of the topic Tp0 (the partition p2) to the consumers (Topic0 Consumers) that perform the process of the topic Tp0 and transmits the collected data of the topic Tp1 (the partition p0) to consumers (Topic1 Consumers) that perform a process of the topic Tp1.

The edge server sv13 collects data of the partition p1 in the data of the topic Tp1 and data of the partition p0 in the topic Tp2. Then, the edge server sv13 transmits the collected data of the topic Tp1 (the partition p1) to the consumers (Topic1 Consumers) that perform the process of the topic Tp1 and transmits the collected data of the topic Tp2 (the partition p0) to a consumer (Topic2 Consumers) that perform a process of the topic Tp2.

In this way, by dividing and processing the data by partition for each topic, the read/write process may be parallelized and the throughput performance may be improved.

<Merging Process>

Figure 5:
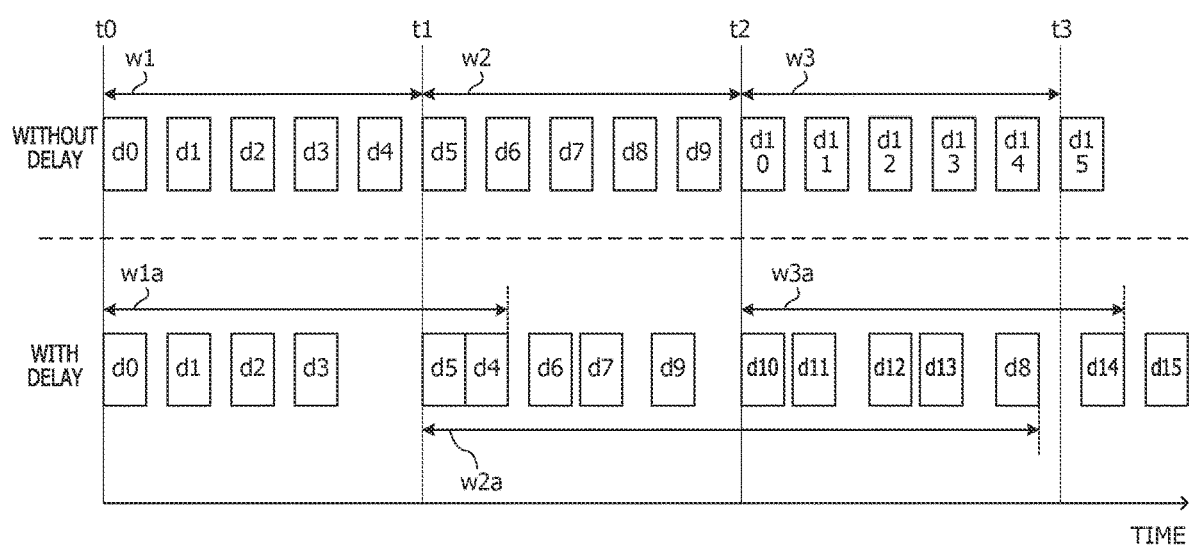
FIG. 5 is a diagram for explaining an example of a merging process.

FIG. 5 is a diagram for explaining an example of a merging process. In stream processing, a merging process of data flows transmitted from a plurality of edge bases is performed. In the merging process, predetermined data processing is performed on data arrived in a time window (hereinafter, referred to as a data reception window) as a single aggregation result. Since the data may arrive with delay, the size of the data reception window is set so that the delayed data may be captured.

The upper part of FIG. 5 illustrates a case where data arrives without delay at a point where a data merging process is performed. Data d0, ..., d4 are detected in a data reception window w1 having a time width from time t0 to time t1, and data d5, ..., d9 are detected in a data reception window w2 having a time width from time t1 to time t2. Further, data d10, ..., d14 are detected in a data reception window w3 having a time width from time t2 to time t3. The sizes of the data reception windows w1, w2, and w3 are the same.

The lower part of FIG. 5 illustrates a case where data arrived with delay at a point where a data merging process is performed. It is assumed that the data d4 arrives with delay past the time t1, the data d8 arrives with delay past the time t2, and the data d14 arrives with delay past the time t3.

At this time, the data d0, ..., d4 are detected in a data reception window w1a having a size larger than that of the data reception window w1, and the data d5, ..., d9 are detected in a data reception window w2a having a size larger than that of the data reception window w2. Further, the data d10, ..., d14 are detected in a data reception window w3a having a size larger than that of the data reception window w3.

In this way, in the merging process, the data acquired in the data reception window is processed, but the data is affected by the network delay or is transmitted from edge bases with different loads. Therefore, a variation will occur in the data arrival time.

In this case, the size of the data reception window is set wide in order to accurately aggregate the data. In the case of the delay in the above example, the data reception window w2a having the widest time width is set so that there is no omission of data acquisition. However, when the size of the data reception window is set to be wide according to the data arrival delay, the memory occupancy time increases, which is inefficient.

Further, when the data reception window is set to be narrow in an attempt to save memory resources, the required data may not be acquired in the data reception window and acquisition omission occurs, resulting in a large error in the aggregation result. The present disclosure has been made in view of such a point, and implements efficient stream processing by suppressing an increase in memory occupancy time.

<Information Processing System>

Figure 6:
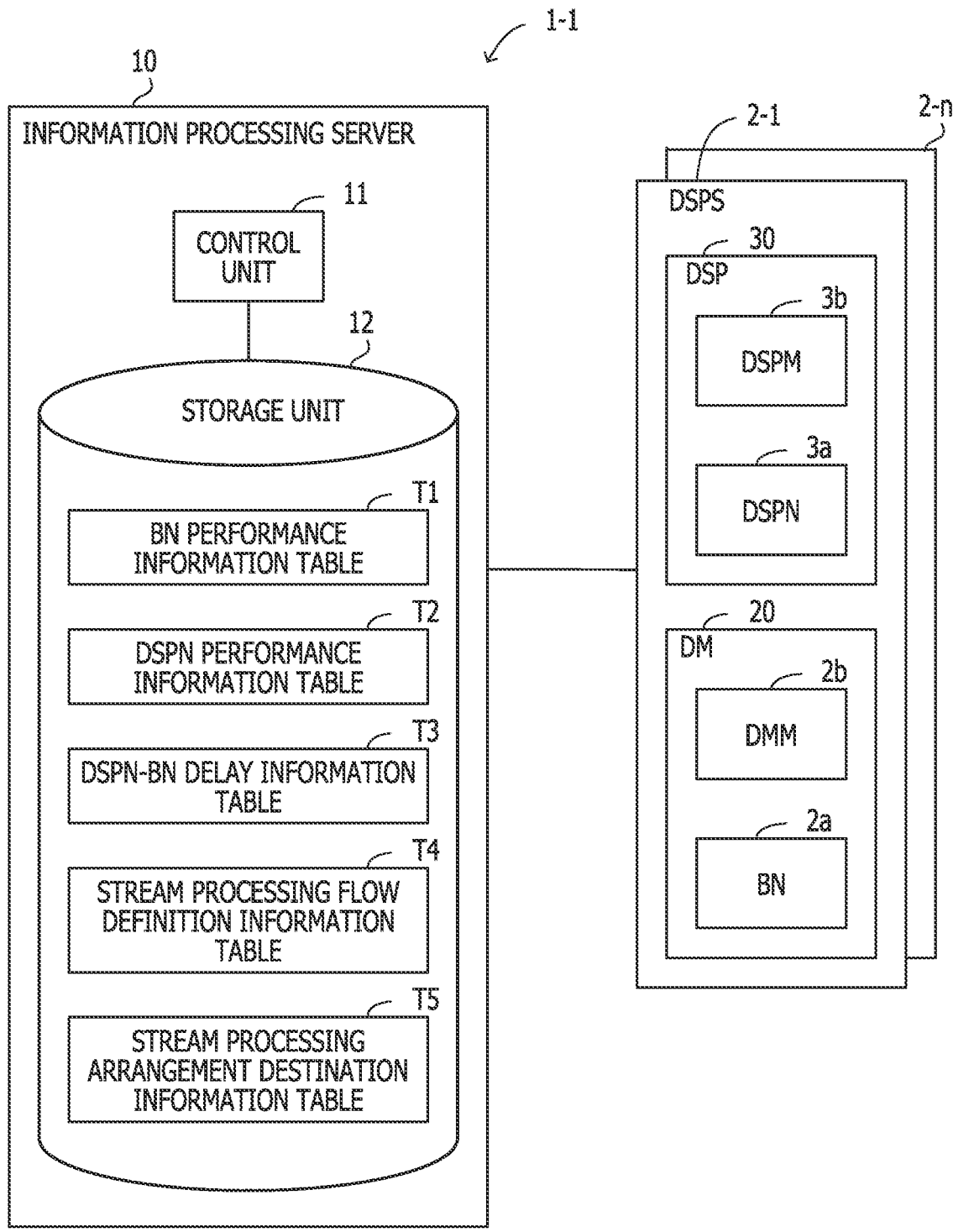
FIG. 6 is a diagram illustrating an example of a functional block of an information processing system.

Next, an information processing system of the second embodiment will be described. FIG. 6 is a diagram illustrating an example of a functional block of an information processing system. The information processing system 1-1 of the second embodiment includes an information processing server 10 and DSPSs 2-1, ..., 2-n. The DSPSs 2-1, ..., 2-n are arranged at edge bases, and the information processing server 10 is arranged at a cloud environment or an edge base.

The information processing server 10 is a server that implements the functions of the information processing apparatus 1 of FIG. 1 and includes a control unit 11 and a storage unit 12. The control unit 11 corresponds to the control unit 1a of FIG. 1, and the storage unit 12 corresponds to the storage unit 1b of FIG. 1.

The control unit 11 receives a plurality of data flows transmitted from the DSPSs 2-1, ..., 2-n, rearranges a generation element (partition) of the data flow having an arrival delay difference larger than a predetermined value among the plurality of data flows from the current location to another location where the arrival delay difference may be reduced, and performs a merging process on the data flow.

The storage unit 12 maintains the table structures of a BN performance information table T1, a DSPN performance information table T2, a DSPN-BN delay information table T3, a stream processing flow definition information table T4, and a stream processing arrangement destination information table T5 (the contents of the tables will be described later).

Figure 7:
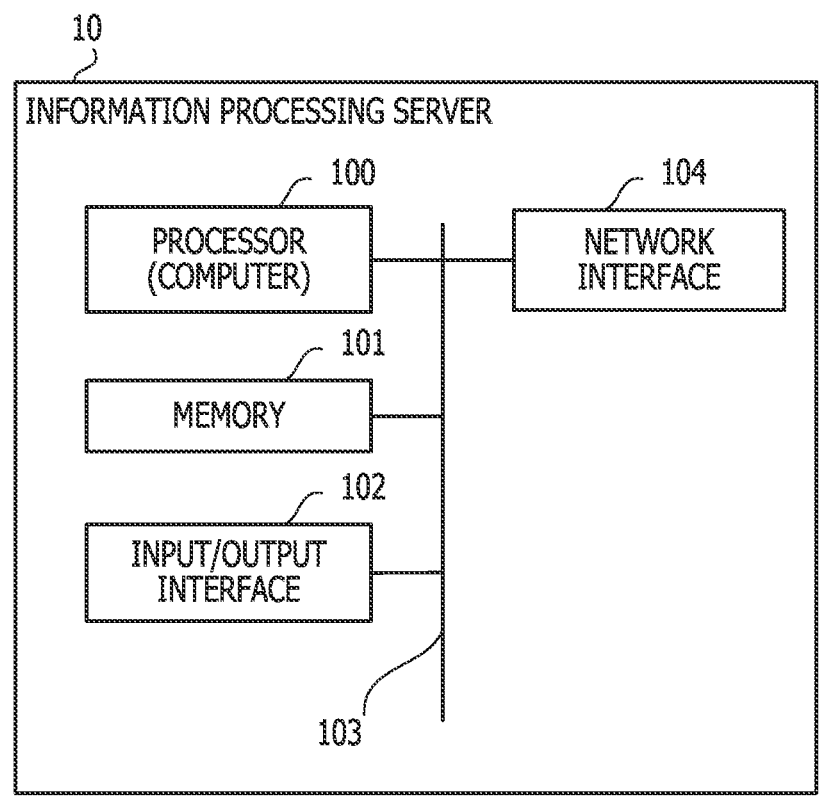
FIG. 7 is a diagram illustrating an example of a hardware configuration of an information processing server.

FIG. 7 is a diagram illustrating an example of a hardware configuration of the information processing server. The information processing server 10 is totally controlled by a processor (computer) 100. The processor 100 implements the function of the control unit 11.

A memory 101, an input/output interface 102, and a network interface 104 are connected to the processor 100 via a bus 103. The processor 100 may be a multiprocessor. The processor 100 is, for example, a CPU (Central Processing Unit), an MPU (Micro Processing Unit), a DSP (Digital Signal Processor), an ASIC (Application Specific Integrated Circuit), or a PLD (Programmable Logic Device). Further, the processor 100 may be a combination of two or more elements of the CPU, MPU, DSP, ASIC, and PLD.

The memory 101 implements the function of the storage unit 12 and is used as a main storage device of the information processing server 10. At least a part of an OS (Operating System) program and application programs to be executed by the processor 100 is temporarily stored in the memory 101. In addition, various data required for processing by the processor 100 are stored in the memory 101.

The memory 101 is also used as an auxiliary storage device for the information processing server 10 and stores an OS program, application programs, and various data. The memory 101 may include a semiconductor storage device such as a flash memory, an SSD (Solid State Drive), or the like, or a magnetic recording medium such as an HDD (Hard Disk Drive) as the auxiliary storage device.

Peripheral devices connected to the bus 103 include the input/output interface 102 and the network interface 104. The input/output interface 102 may be connected to an information input device such as a keyboard, a mouse, or the like, to transmit signals, which are sent from the information input device, to the processor 100.

Further, the input/output interface 102 also functions as a communication interface for connecting peripheral devices. For example, the input/output interface 102 may be connected to an optical drive device that reads data recorded on an optical disc by using laser light or the like. Examples of the optical disc may include Blu-ray Disc®, CD-ROM (Compact Disc Read Only Memory), CD-R (Recordable)/RW (Rewritable), and the like.

Further, the input/output interface 102 may be connected to a memory device or a memory reader/writer. The memory device is a recording medium equipped with a function of communication with the input/output interface 102. The memory reader/writer is a device that writes data in or reads data from a memory card. The memory card is a card-type recording medium.

The network interface 104 connects to a network to control the network interface and performs communication interface with, for example, the DSPS 2. For example, an NIC (Network Interface Card), a wireless LAN (Local Area Network) card, or the like may be used for the network interface 104. The data received by the network interface 104 are output to the memory 101 and the processor 100.

The processing function of the information processing server 10 may be implemented with the hardware configuration as described above. For example, the information processing server 10 may perform the processing of the present disclosure by each processor 100 executing a predetermined program.

The information processing server 10 implements the processing function of the present disclosure, for example, by executing a program recorded on a computer-readable recording medium. A program, which describes the processing contents, to be executed by the information processing server 10 may be recorded on various recording media.

For example, a program to be executed by the information processing server 10 may be stored in an auxiliary storage device. The processor 100 loads at least a part of the program in the auxiliary storage device into the main storage device, and executes the program.

The program may also be recorded on a portable recording medium such as an optical disc, a memory device, a memory card, or the like. The program stored in the portable recording medium may be executed after being installed in the auxiliary storage device, for example, under control of the processor 100. The processor 100 may also read and execute the program directly from the portable recording medium.

<Table Configuration>

The tables maintained in the storage unit 12 will be described with reference to FIGS. 8 to 12. FIG. 8 is a diagram illustrating an example of the BN performance information table. The BN performance information table T1 has attributes of a BN-ID, write delay, and read delay. The BN-ID is an ID that identifies BN. The write delay is a write delay measurement average value for BN. The read delay is a read delay measurement average value from BN.

Figure 9:
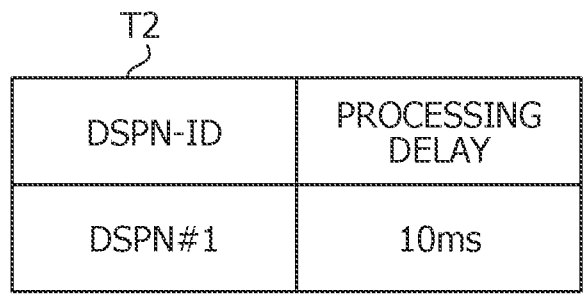
FIG. 9 is a diagram illustrating an example of a DSPN (data stream processing node) performance information table.

FIG. 9 is a diagram illustrating an example of the DSPN performance information table. The DSPN performance information table T2 has attributes of a DSPN-ID and processing delay. The DSPN-ID is an ID that identifies DSPN. The processing delay is a processing delay measurement average value for DSPN.

FIG. 10 is a diagram illustrating an example of the DSPN-BN delay information table. The DSPN-BN delay information table T3 has attributes of a source node ID, a destination node ID, and a network delay. The source node ID is an ID that identifies BN or DSPN. The destination node ID is an ID that identifies BN or DSPN. The network delay is a delay required for network transfer between DSPN and BN.

Figure 11:
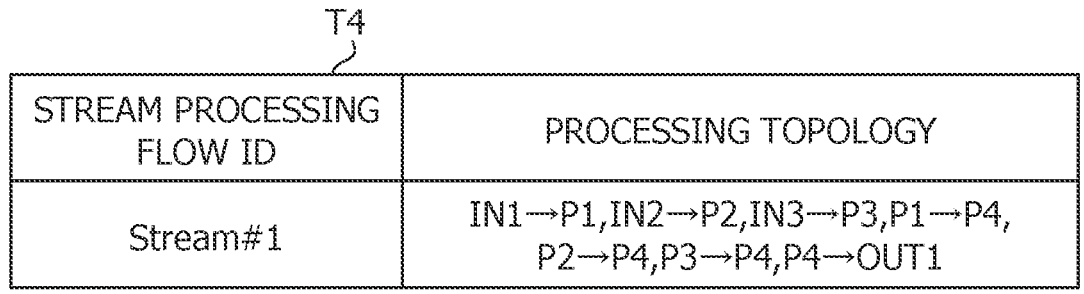
FIG. 11 is a diagram illustrating an example of a stream processing flow definition information table.

FIG. 11 is a diagram illustrating an example of the stream processing flow definition information table. The stream processing flow definition information table T4 has attributes of stream processing flow ID and processing topology. The stream processing flow ID is an ID that identifies a stream processing flow. The processing topology is information indicating the relationship between partitions that make up stream processing (to be described later in FIG. 13).

FIG. 12 is a diagram illustrating an example of the stream processing arrangement destination information table. The stream processing arrangement destination information table T5 has attributes of stream processing flow ID, data/stream processing ID, and data/stream processing arrangement destination information.

The stream processing flow ID is an ID that identifies a stream processing flow. The data/stream processing ID is a data ID that constitutes the stream processing flow and an ID that identifies stream processing. The data/stream processing arrangement destination information is a node ID that identifies an arrangement destination of each data constituting the stream processing flow and an arrangement destination of stream processing, and becomes an ID of BN or DSPN.

<Stream Processing Flow>

FIG. 13 is a diagram illustrating an example of a stream processing flow. Data sources, data sinks, and process Partitions are assigned IDs to define the stream processing flow. In this example, IN indicates data (input data), P indicates a process, and OUT indicates output data.

In a stream processing flow F1, data IN1 is input to a process P1, data IN2 is input to a process P2, and data IN3 is input to a process P3. Further, the data on which the process P1 is executed is input to a process P4, the data on which the process P2 is executed is input to the process P4, and the data on which the process P3 is executed is input to the process P4. Then, the data in which the process P4, which is a merging process, is executed becomes output data OUT1.

A flow from the input data IN to the merging process P is a merging source flow and corresponds to the data flow illustrated in FIG. 1 (hereinafter, may also be referred to as a sub-flow). Such a stream processing flow F1 is registered, for example, by an expression such as DAG (Directed Acyclic Graph) or the like with respect to the processing topology of the stream processing flow definition information table T4 illustrated in FIG. 11.

<Contents of Message>

The contents of messages communicated between the information processing server 10 and the DSPS 2 will be described with reference to FIGS. 14 to 18. FIG. 14 is a diagram illustrating an example of BN performance information. The BN performance information m1 is a message transmitted from the DSPS 2 to the information processing server 10 and has fields for a destination address, a source address, a BN-ID, write delay, and read delay.

The destination address is an address of the information processing server 10. The source address is an address of an edge server (BN, DSPN) of an information source. The BN-ID is an ID that identifies a BN. The write delay is a value of write delay in BN. The read delay is a value of read delay in BN FIG. 15 is a diagram illustrating an example of DSPN performance information. The DSPN performance information m2 is a message transmitted from the DSNS 2 to the information processing server 10 and has fields of a destination address, a source address, a DSPN-ID, and DSPN processing delay.

The destination address is an address of the information processing server 10. The source address is an address of an edge server (BN, DSPN) of an information source. The DSPN-ID is an ID that identifies a DSPN. The DSPN processing delay is a value of processing delay in DSPN.

FIG. 16 is a diagram illustrating an example of network delay information. The network delay information m3 is a message transmitted from the DSPS 2 to the information processing server 10 and has fields of a destination address, a source address, a source node ID, a destination node ID, and network delay.

The destination address is an address of the information processing server 10. The source address is an address of an edge server (BN, DSPN) of an information source. The source node ID is an ID that identifies a BN/DSPN on the source side. The destination node ID is an ID that identifies a BN/DSPN on the destination side. The network delay is a value of network delay between the source node and the destination node.

FIG. 17 is a diagram illustrating an example of data arrangement control information. The data arrangement control information m4 is a message transmitted from the information processing server 10 to the DSPS 2 and has fields of a destination address, a source address, a BN-ID, a topic, a partition, and a method.

The destination address is an address of a destination BN. The source address is an address of the information processing server 10. The BN-ID is an ID that identifies a BN. The topic is a topic name of an arrangement control target. The partition is a partition ID of the arrangement control target. For the method, one of arrangement when a target partition is "1" and deletion (with movement) when the target partition is "2" is designated.

FIG. 18 is a diagram illustrating an example of processing execution control information. The processing execution control information m5 is a message transmitted from the information processing server 10 to the DSPS 2 and has fields of a destination address, a source address, a DSPN-ID, a stream processing flow ID, a merging source flow ID, a method, and a parameter.

The destination address is an address of a reception DSPN. The source address is an address of the information processing server 10. The DSPN-ID is an ID that identifies a DSPN. The stream processing flow ID is an ID that identifies a stream processing flow. The merging source flow ID is a part of the stream processing flow and is an ID that identifies a merging source flow which is a control target. The method designates the arrangement when the method is "1", the deletion (with movement) when the method is "2", and the size of the data reception window when the method is "3". The parameter designates a data reception window size when method=3.

<Flowchart>

Figure 19:
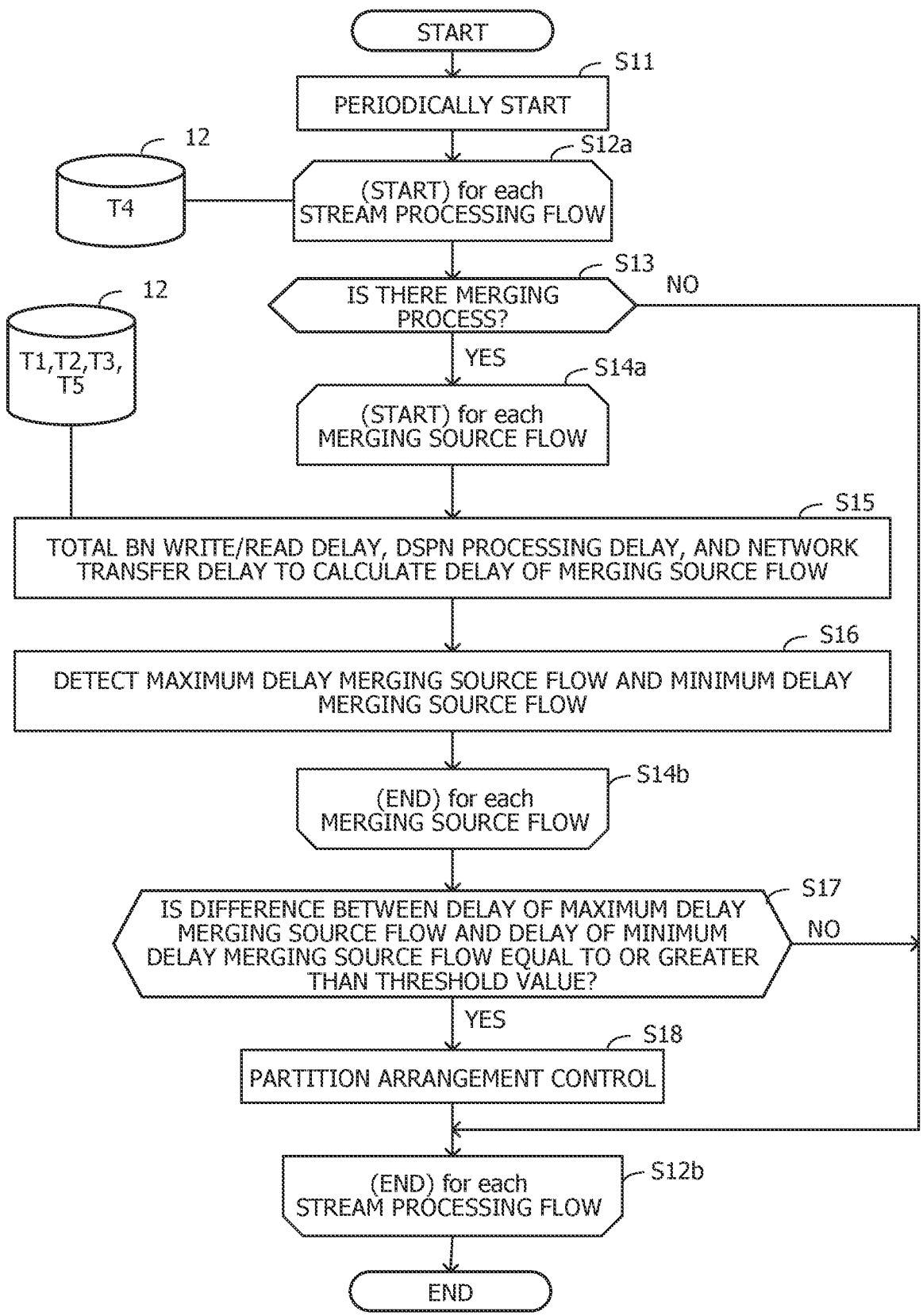
FIG. 19 is a flowchart illustrating an example of an operation of detecting the existence of a control target flow.
Figure 20:
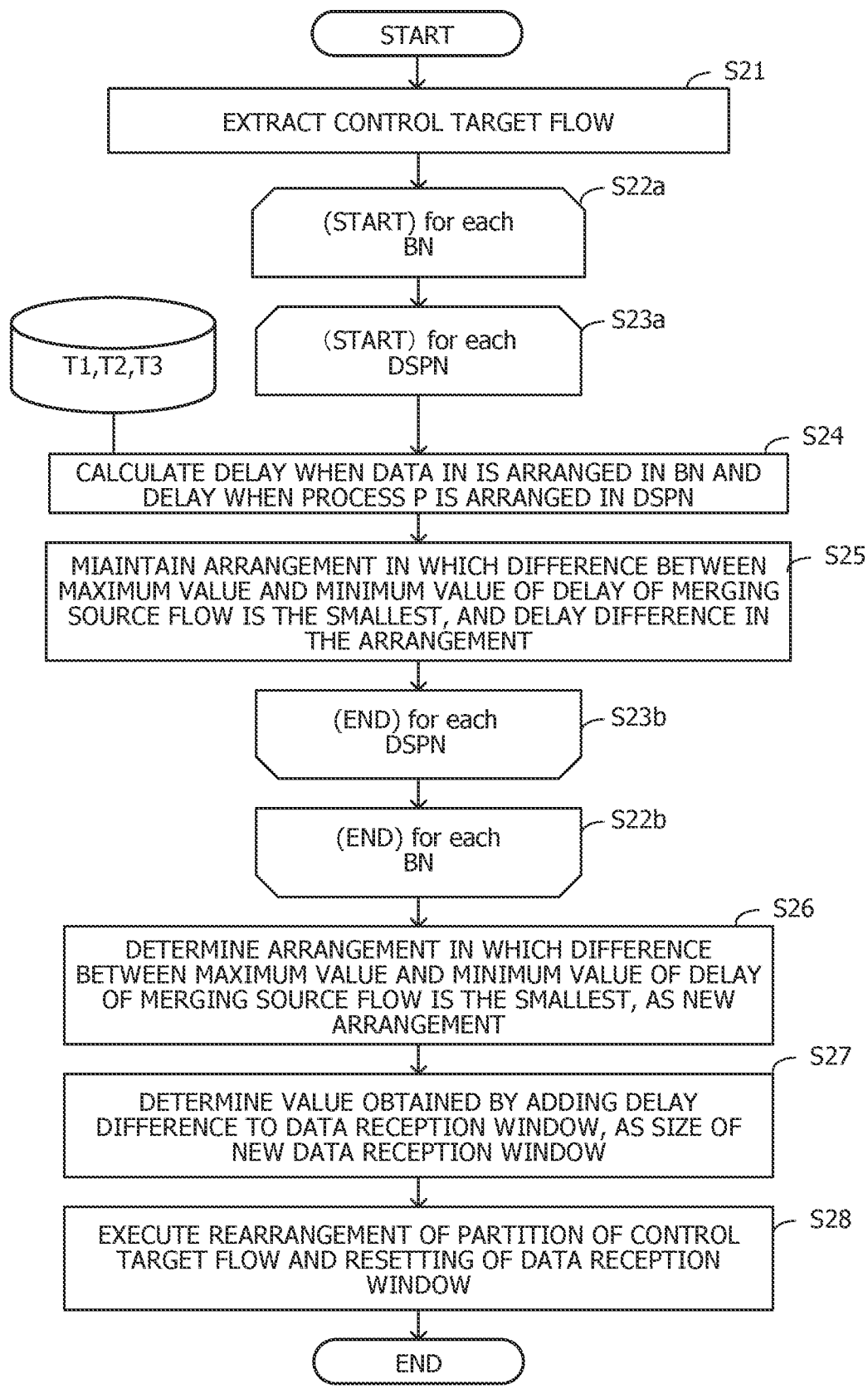
FIG. 20 is a flowchart illustrating an example of an operation of partition arrangement control.

The operation of the control unit 11 will be described with reference to the flowcharts of FIGS. 19 and 20. FIG. 19 is a flowchart illustrating an example of an operation of detecting the existence of a control target flow. The figure illustrates an operation of detecting whether a control target flow, which is a merging source flow that requires rearrangement of partition, exists in a stream processing flow.

[Step S11] The control unit 11 periodically starts a process of detecting whether there is a control target flow in a stream processing flow.

[Steps S12*a* and S12*b*] The control unit 11 repeatedly executes the processes of steps S13 to S18 for each stream processing flow registered in the stream processing flow definition information table T4.

[Step S13] The control unit 11 determines whether there is a merging process in the stream processing flow selected from the stream processing flow definition information table T4. When it is determined that there is a merging process, the process proceeds to step S14*a*. Otherwise, the process ends.

[Steps S14*a* and S14*b*] The control unit 11 repeatedly executes the processes of steps S15 and S16 for each merging source flow.

[Step S15] The control unit 11 calculates a delay of the merging source flow based on the BN performance information table T1, the DSPN performance information table T2, the DSPN-BN delay information table T3, and the stream processing arrangement destination information table T5. That is, the control unit 11 totals the BN write/read delay, the DSPN processing delay, the network transfer delay, and the like to calculate the delay of the merging source flow.

[Step S16] The control unit 11 detects the maximum delay merging source flow having the maximum delay and the minimum delay merging source flow having the minimum delay.

[Step S17] The control unit 11 determines whether a difference between a delay value of the maximum delay merging source flow and a delay value of the minimum delay merging source flow is equal to or greater than a threshold value. When it is determined that the difference is equal to or greater than the threshold value, the process proceeds to step S18. When it is determined that the difference is smaller than the threshold value, the process ends.

[Step S18] The control unit 11 recognizes that a control target flow exists in the selected stream processing flow, and controls partition arrangement control. FIG. 20 is a flowchart illustrating an example of an operation of partition arrangement control. The figure illustrates the detailed operation of step S18 in FIG. 19.

[Step S21] The control unit 11 calculates an average value of a plurality of merging source flows (a merging source flow group) included in the stream processing flow. Then, the control unit 11 obtains a difference between the delay value of the maximum delay merging source flow and the average value and a difference between the delay value of the minimum delay merging source flow and the average value, and extracts, as the control target flow, a merging source flow having the larger one of the two obtained differences (either the maximum delay merging source flow or the minimum delay merging source flow).

Here, step S21 will be described with a specific example. It is assumed that there are data flows f1, f2, and f3, and the delay times until the arrival at a merging process Point are 5 s, 10 s, and 30 s, respectively. The average delay time is 15 s (=(5+10+30)/3), the maximum delay time is 30 s (data flow f3), and the minimum delay time is 5 s (data flow f1).

Then, the control unit 11 obtains a first difference (=15 s) between the maximum delay time (=30 s) and the average delay time (=15 s), and obtains a second difference (=10 s) between the minimum delay time (=5 s) and the average delay time (=15 s). At this time, since the first difference (15 s) is larger than the second difference (10 s), the control unit 11 detects the maximum delay data flow f3 having the maximum delay time (=30 s) as the control target data flow having a larger arrival delay difference.

Meanwhile, it is assumed that there are data flows f1*a*, f2*a*, and f3*a*, and the delay times until the arrival at a merging process Point are 5 s, 20 s, and 23 s, respectively. The average delay time is 16 s (=(5+20+23)/3), the maximum delay time is 23 s (data flow f3a), and the minimum delay time is 5 s (data flow f1a).

Then, the control unit 11 obtains a first difference (=7 s) between the maximum delay time (=23 s) and the average delay time (=16 s), and obtains a second difference (=11 s) between the minimum delay time (=5 s) and the average delay time (=16 s). At this time, since the second difference (11 s) is larger than the first difference (7 s), the control unit 11 detects the minimum delay data flow f1a having the minimum delay time (=5 s) as the control target data flow having a larger arrival delay difference.

By detecting the control target flow with such processing, it is possible to efficiently detect the control target flow having the largest arrival delay difference deviating from the average delay time.

[Steps S22a and S22b] The control unit 11 repeatedly executes the processes of steps S24 and S25 for each BN.

[Steps S23a and S23b] The control unit 11 repeatedly executes the processes of steps S24 and S25 for each DSPN.

[Step S24] The control unit 11 calculates a delay when data IN, which is a partition for BN, and process P, which is a partition for DSPN, are arranged based on the BN performance information table T1, the DSPN performance information table T2, and the DSPN-BN delay information table T3.

[Step S25] When arranging a partition of the control target flow on a movement destination candidate, the control unit 11 maintains an arrangement in which a difference between the maximum value and the minimum value of the delay of the merging source flow becomes the smallest, and maintains a delay difference in the arrangement.

[Step S26] The control unit 11 determines a destination position of the partition of the control target flow when the difference between the maximum value and the minimum value of the delay of the merging source flow is the smallest, as new arrangement.

Here, for example, it is assumed that there are merging source flows a1, a2, and a3, the delay of the merging source flow a1 is 3 s, the delay of the merging source flow a2 is 8 s, and the delay of the merging source flow a3 is 30 s with respect to a merging point, and the merging source flow a3 becomes the control target flow.

At this time, it is assumed that the delay of a merging source flow a3-1 that moves the partition of the merging source flow a3 to a position A becomes 2 s, and the delay of a merging source flow a3-2 that moves the partition of the merging source flow a3 to a position B becomes 10 s.

In this case, since the minimum value of the delay among the merging source flows a1, a2, and a3-1 is 2 s and the maximum value of the delay is 8 s, the delay difference becomes 6 s. Further, since the minimum value of the delay among the merging source flows a1, a2, and a3-2 is 3 s and the maximum value of the delay is 10 s, the delay difference is 7 s.

In this case, since the delay difference is smaller when the control target flow is moved to the position A than when it is moved to the position B (6 s<7 s), a movement destination, which becomes the merging source flow a3-1 when the delay difference becomes 6 s, is selected. That is, the merging source flow a3 is moved to the position A.

By performing such processing, it is possible to determine the optimal arrangement location with a small arrival variation time among a plurality of destination candidates.

[Step S27] The control unit 11 adds the delay difference (6 s in the above example) maintained in step S25 to the currently set data reception window, and determines the size of a new data reception window after the addition.

[Step S28] The control unit 11 rearranges the partition (data IN, process P) and resets the data reception window (sets the data reception window calculated in step S27).

In this way, after the rearrangement is executed to change the arrangement location of the partition of the control target data, the delay difference maintained in step S25 is added to the data reception window to set as a new data reception window. As a result, it is possible to efficiently set the size of the data reception window having the minimum width without data acquisition omission.

<Operation Example>

Figure 21:
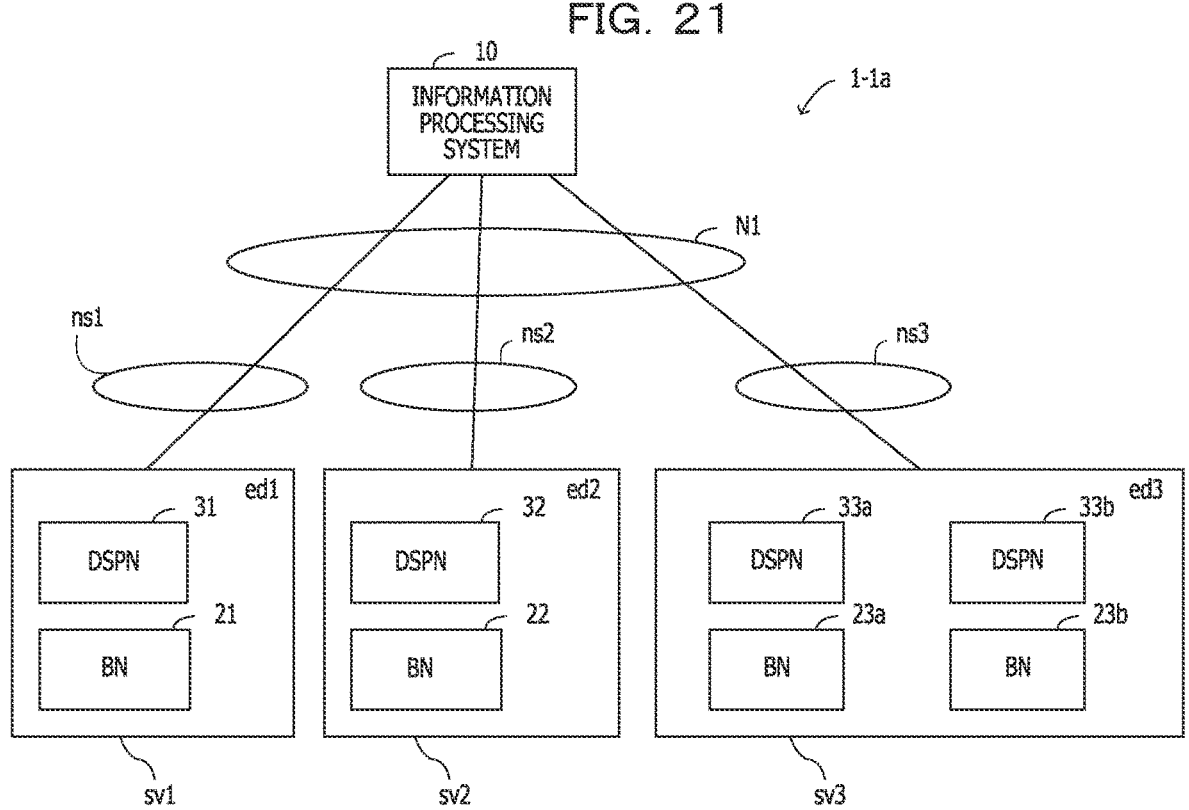
FIG. 21 is a diagram illustrating the configuration of an information processing system for explaining an operation example.

A specific operation example will be described with reference to FIGS. 21 to 33. FIG. 21 is a diagram illustrating the configuration of an information processing system for explaining an operation example. The information processing system 1-1a includes an information processing server 10 and edge servers sv1, sv2, and sv3. The edge server sv1 is located at an edge base ed1 and is connected to the information processing server 10 via a sub-net ns1 and a wide area network N1.

The edge server sv2 is located at an edge base ed2 and is connected to the information processing server 10 via a sub-net ns2 and the wide area network N1. The edge server sv3 is located at an edge base ed3 and is connected to the information processing server 10 via a sub-net ns3 and the wide area network N1.

The edge server sv1 includes a BN 21 and a DSPN 31, and the edge server sv2 includes a BN 22 and a DSPN 32. The edge server sv3 includes BNs 23a and 23b and DSPNs 33a and 33b.

(When there are many processes that coexist on the edge server side)

When there are many processes that coexist on the edge server side, control for eliminating a state in which the memory occupancy time on the information processing server 10 side increases will be described with reference to FIGS. 22 to 24.

Figure 22:
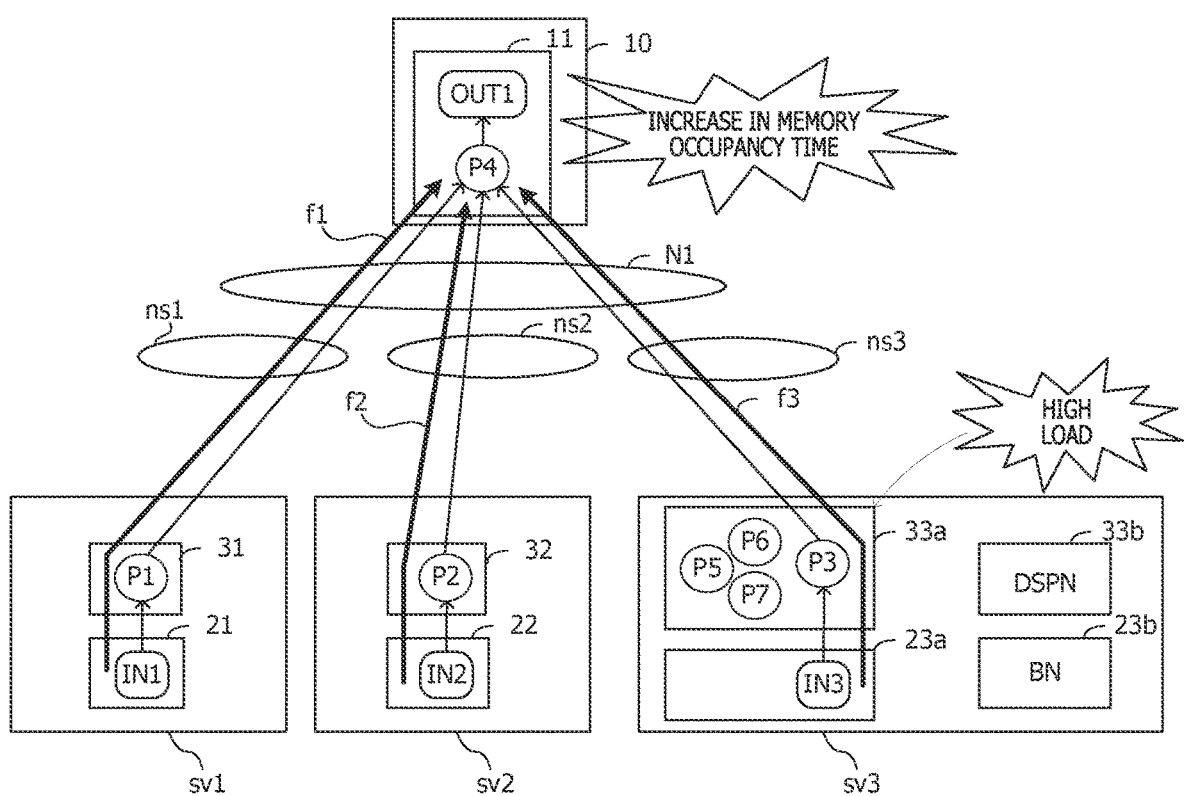
FIG. 22 is a diagram illustrating an example of a state in which the memory occupancy time increases.

FIG. 22 is a diagram illustrating an example of a state in which the memory occupancy time increases. A merging source flow (hereinafter, referred as a sub-flow) f1 is a data flow in which the data IN1 stored in the BN 21 is input to the process P1 of the DSPN 31 to execute the process P1, and data executed by the process P1 is input to the merging process P4 of the information processing server 10.

A sub-flow f2 is a data flow in which the data IN2 stored in the BN 22 is input to the process P2 of the DSPN 32 to execute the process P2, and data executed by the process P2 is input to the merging process P4 of the information processing server 10.

A sub-flow f3 is a data flow in which the data IN3 stored in the BN 23a is input to the process P3 of the DSPN 33a to execute the process P3, and data executed by the process P3 is input to the merging process P4 of the information processing server 10.

Here, in the DSPN 33a in the edge server sv3, processes P5, P6, and P7 are executed in addition to the process P3, and there are many coexisting processes. In this case, since the DSPN 33a has a high load, the delay of the sub-flow f3 becomes larger. Therefore, in the merging process P4 in the information processing server 10, data waiting of the sub-flow f3 occurs and the memory occupancy time increases.

Figure 23:
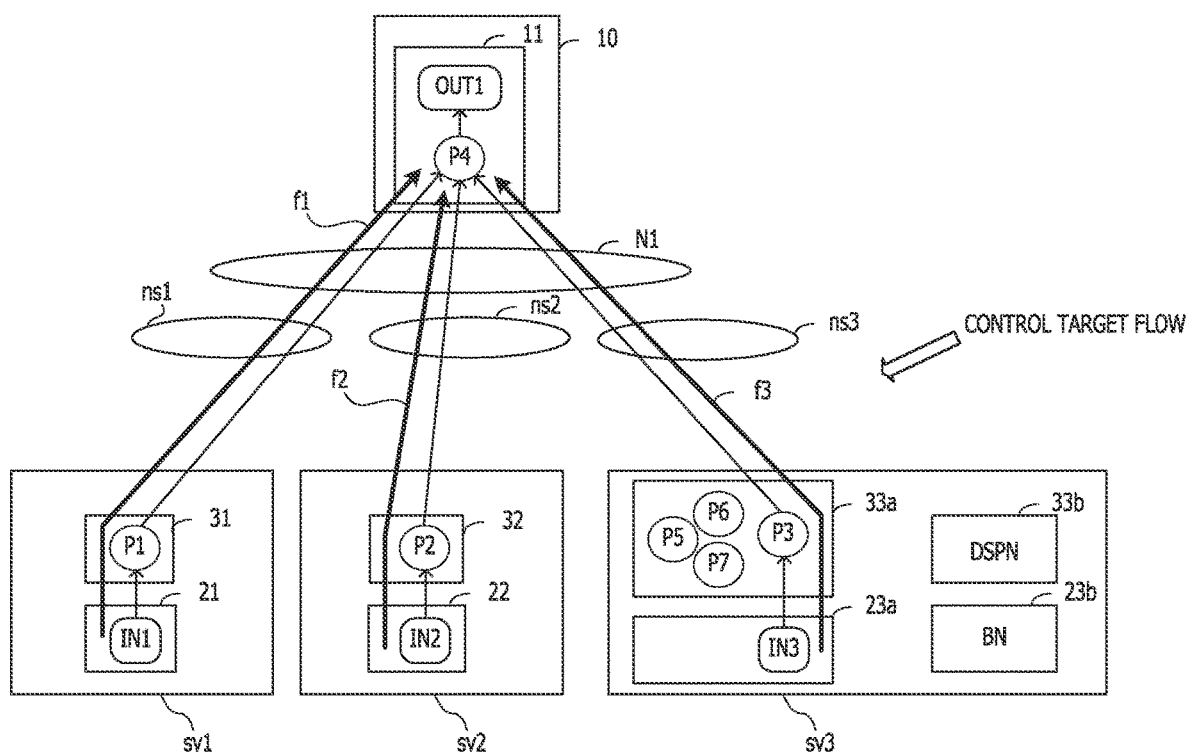
FIG. 23 is a diagram illustrating an example of extraction of a control target flow.

FIG. 23 is a diagram illustrating an example of extraction of the control target flow. The control unit 11 extracts the control target flow from the sub-flows f1, f2, and f3. Assuming that the delay of the sub-flow f1 is 3 s, the delay of the sub-flow f2 is 3 s, and the delay of the sub-flow f3 is 30 s, the sub-flow f3 is extracted as the control target flow having the largest arrival delay difference.

That is, the control unit 11 totals the write delay and the read delay of the BN 21, the processing delay of the DSPN 31, and the network transfer delay between the edge server sv1 and the information processing server 10 to calculate the delay of the sub-flow f1.

Further, the control unit 11 totals the write delay and the read delay of the BN 22, the processing delay of the DSPN 32, and the network transfer delay between the edge server sv2 and the information processing server 10 to calculate the delay of the sub-flow f2.

Further, the control unit 11 totals the write delay and the read delay of the BN 23a, the processing delay of the DSPN 33a, and the network transfer delay between the edge server sv3 and the information processing server 10 to calculate the delay of the sub-flow f3.

Then, the control unit 11 obtains a difference df1 between the delay average value of the sub-flows f1, f2, and f3 and the sub-flows f1 an f2 having the minimum delay. Further, the control unit 11 obtains a difference df2 between the delay average value of the sub-flows f1, f2, and f3 and the sub-flow f3 having the maximum delay. Comparing these differences, since the difference df2>the difference df1, the control unit 11 determines the sub-flow f3 as the control target flow.

Figure 24:
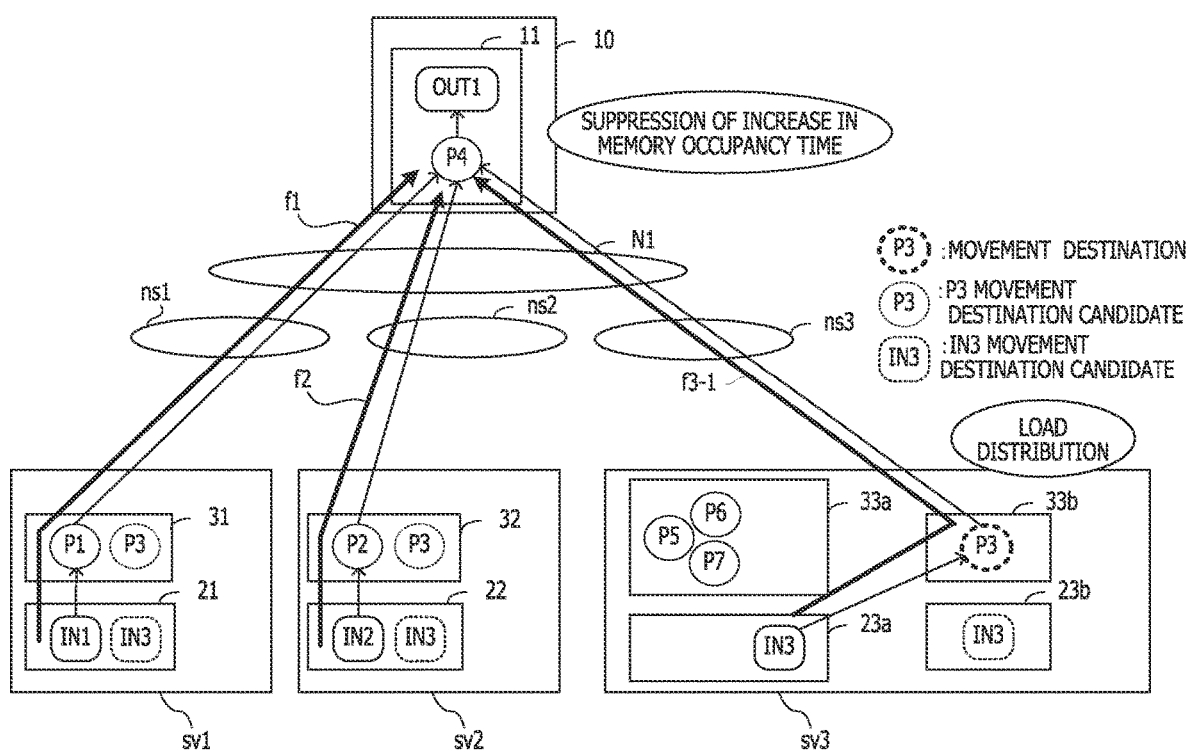
FIG. 24 is a diagram illustrating an example of partition arrangement control.

FIG. 24 is a diagram illustrating an example of partition arrangement control. The control unit 11 searches for the input data IN3 of the partition of the sub-flow f3 and a movement destination of the process P3. Movement destination candidates of the input data IN3 are the BNs 21, 22, and 23b, and movement destination candidates of the process P3 are the DSPNs 31, 32, and 33b.

The control unit 11 selects a movement destination as a solution so that the delay of the sub-flow f3 is about the same as that of the sub-flows f1 and f2, and moves the input data IN3 or the process P3 to the selected movement destination. In the example of FIG. 24, the input data IN3 is not moved from the BN 23a, but the process P3 is moved from the DSPN 33a to the DSPN 33b. As a result, the delay of the sub-flow f3-1 after the rearrangement is set to 3 s.

By such partition arrangement control, a load is distributed in the edge server sv3, and the variation in the arrival times of the sub-flows f1, f2, and f3-1 is reduced, so that the increase in the memory occupancy time may be suppressed.

(When the processing amount on the edge server side is excessive)

When the processing amount on the edge server side is excessive, control for eliminating a state in which the memory occupancy time on the information processing server 10 side increases will be described with reference to FIGS. 25 to 27.

Figure 25:
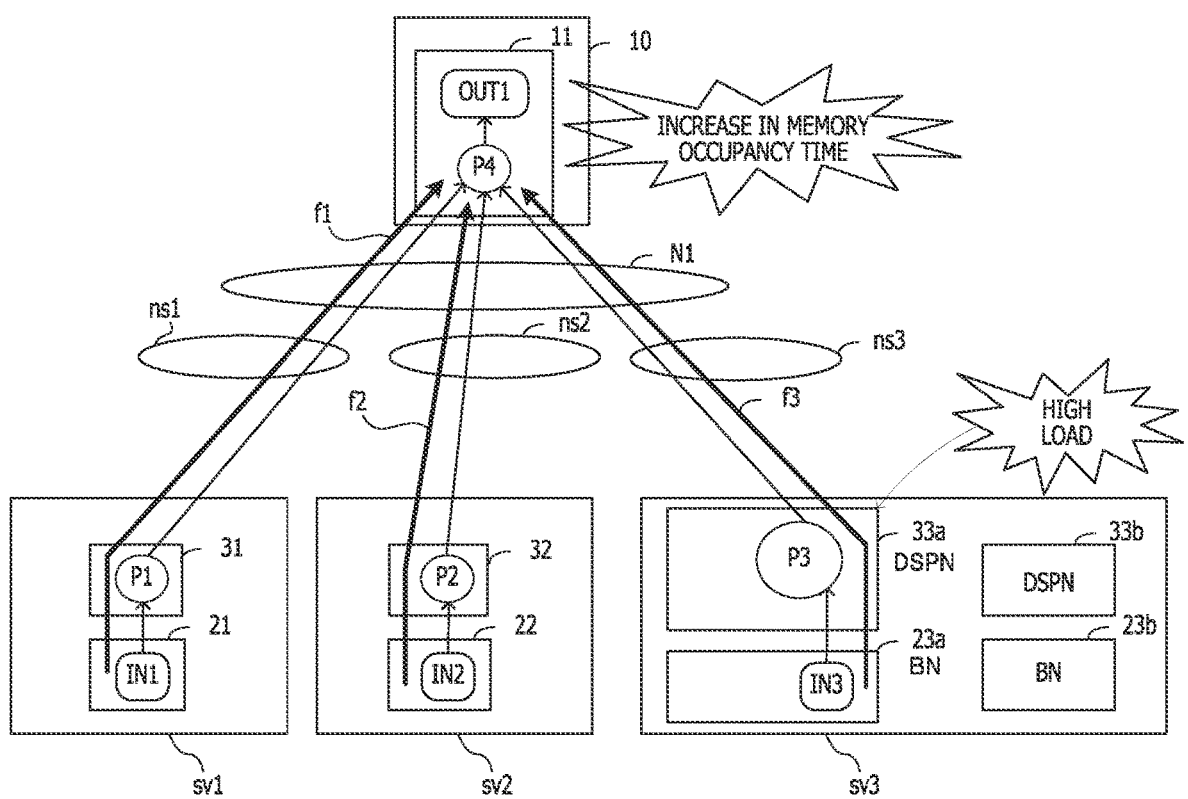
FIG. 25 is a diagram illustrating an example of a state in which the memory occupancy time increases.

FIG. 25 is a diagram illustrating an example of a state in which the memory occupancy time increases. A sub-flow f1 is a data flow in which the data IN1 stored in the BN 21 is input to the process P1 of the DSPN 31 to execute the process P1, and data executed by the process P1 is input to the merging process P4 of the information processing server 10.

A sub-flow f2 is a data flow in which the data IN2 stored in the BN 22 is input to the process P2 of the DSPN 32 to execute the process P2, and data executed by the process P2 is input to the merging process P4 of the information processing server 10.

A sub-flow f3 is a data flow in which the data IN3 stored in the BN 23a is input to the process P3 of the DSPN 33a to execute the process P3, and data executed by the process P3 is input to the merging process P4 of the information processing server 10.

Here, in the DSPN 33a in the edge server sv3, the processing amount of the process P3 is in an excessive state. In this case, since the DSPN 33a has a high load, the delay of the sub-flow f3 becomes larger. Therefore, in the merging process P4 in the information processing server 10, data waiting of the sub-flow f3 occurs and the memory occupancy time increases.

Figure 26:
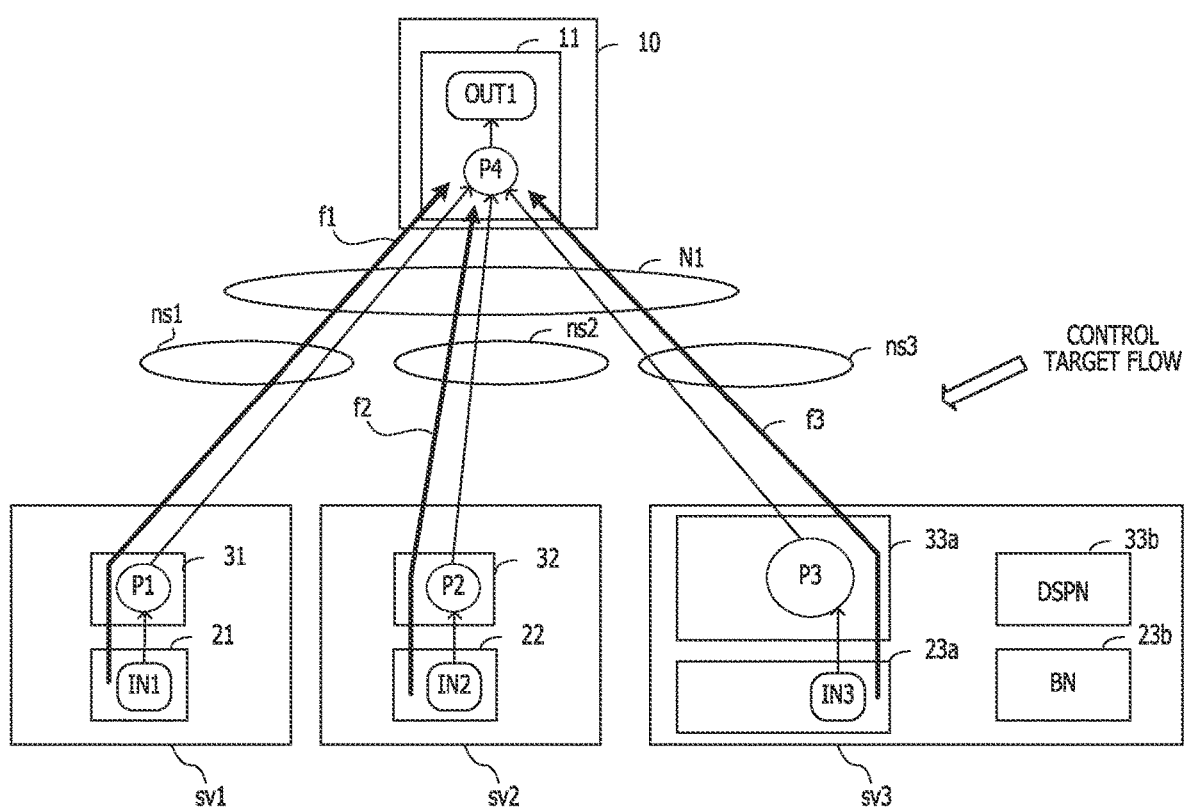
FIG. 26 is a diagram illustrating an example of extraction of a control target flow.

FIG. 26 is a diagram illustrating an example of extraction of the control target flow. The control unit 11 extracts the control target flow from the sub-flows f1, f2, and f3. Assuming that the delay of the sub-flow f1 is 3 s, the delay of the sub-flow f2 is 3 s, and the delay of the sub-flow f3 is 30 s, the sub-flow f3 is extracted as the control target flow having the largest arrival delay difference.

Figure 27:
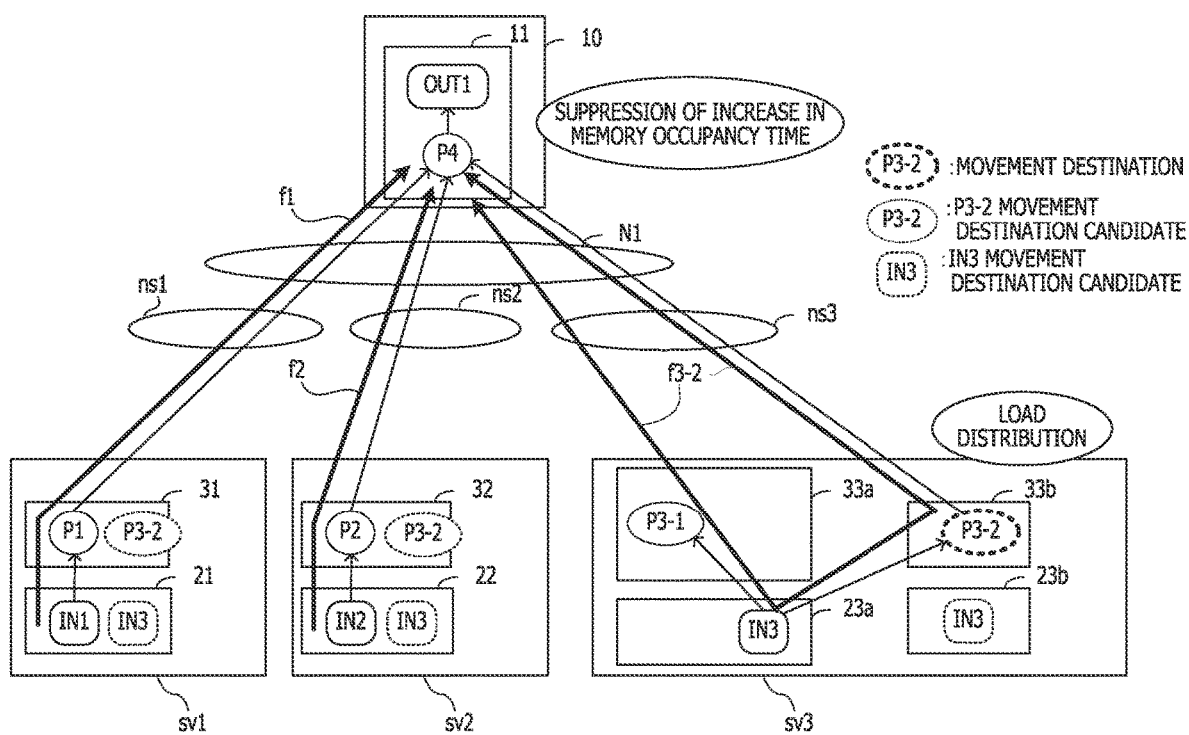
FIG. 27 is a diagram illustrating an example of partition arrangement control.

FIG. 27 is a diagram illustrating an example of partition arrangement control. The control unit 11 divides the process P3 of the partition of the sub-flow f3 into processes P3-1 and P3-2 and searches for a movement destination of the process P3-1 and a movement destination of the process P3-2.

Movement destination candidates of the input data IN3 are the BNs 21, 22, and 23b, and movement destination candidates of the process P3-2 are the DSPNs 31, 32, and 33b. The control unit 11 selects a movement destination as a solution so that the delay of the sub-flow f3 is about the same as that of the sub-flows f1 and f2, and moves the input data IN3 and the process P3-2 to the selected movement destination.

In the example of FIG. 27, the input data IN3 is not moved from the BN 23a, but the process P3-2 is moved to the DSPN 33b. As a result, the delay of the sub-flow f3-2 after the rearrangement is set to 3 s. By such partition arrangement control, a load is distributed in the edge server sv3, and the variation in the arrival times of the sub-flows f1, f2, and f3-2 is reduced, so that the increase in the memory occupancy time may be suppressed.

(When there are many input data accumulated on the edge server side)

When there are many input data accumulated on the edge server side, control for eliminating a state in which the memory occupancy time on the information processing server 10 side increases will be described with reference to FIGS. 28 to 30.

Figure 28:
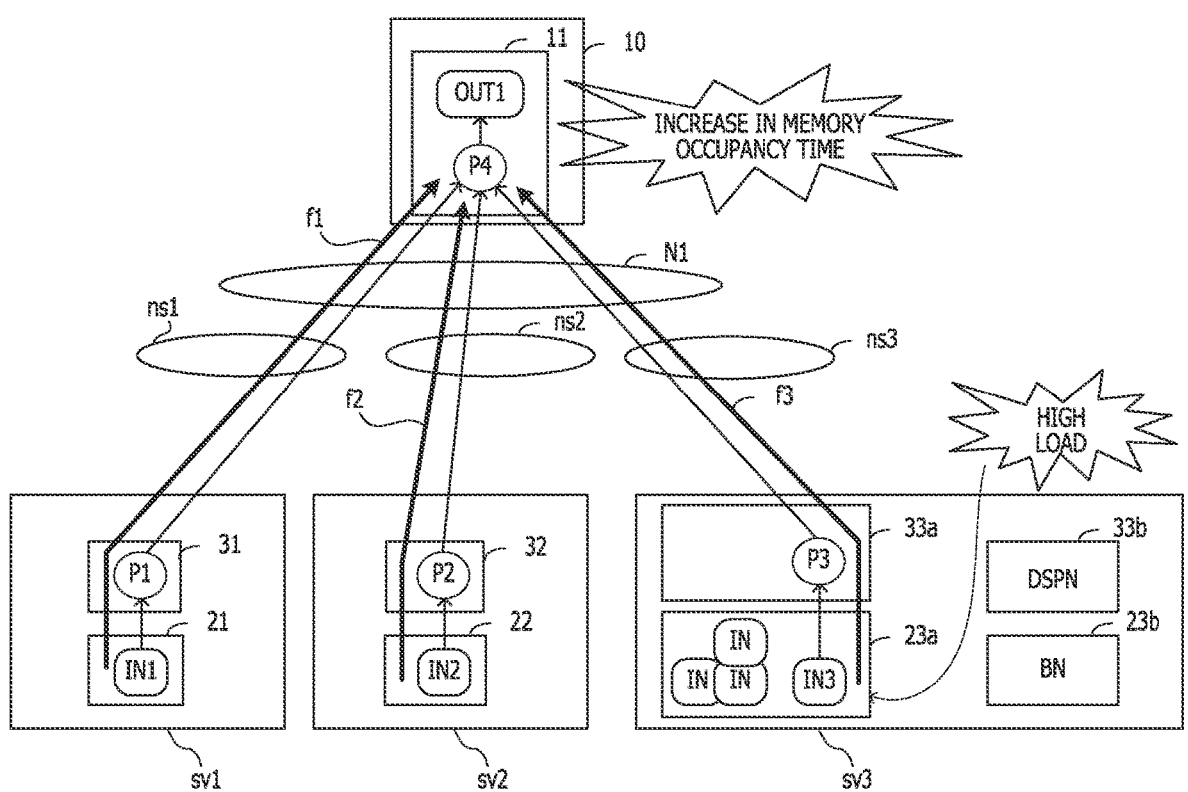
FIG. 28 is a diagram illustrating an example of a state in which the memory occupancy time increases.

FIG. 28 is a diagram illustrating an example of a state in which the memory occupancy time increases. A sub-flow f1 is a data flow in which the data IN1 stored in the BN 21 is input to the process P1 of the DSPN 31 to execute the process P1, and data executed by the process P1 is input to the merging process P4 of the information processing server 10.

A sub-flow f2 is a data flow in which the data IN2 stored in the BN 22 is input to the process P2 of the DSPN 32 to execute the process P2, and data executed by the process P2 is input to the merging process P4 of the information processing server 10.

A sub-flow f3 is a data flow in which the data IN3 stored in the BN 23a is input to the process P3 of the DSPN 33a to execute the process P3, and data executed by the process P3 is input to the merging process P4 of the information processing server 10.

Here, in the BN 23a in the edge server sv3, input processing of a plurality of data IN is executed in addition to the data IN3, and there are many accumulated input data. In this case, since the BN 23a has a high load, the delay of the sub-flow f3 becomes larger. Therefore, in the merging process P4 in the information processing server 10, data waiting of the sub-flow f3 occurs and the memory occupancy time increases.

Figure 29:
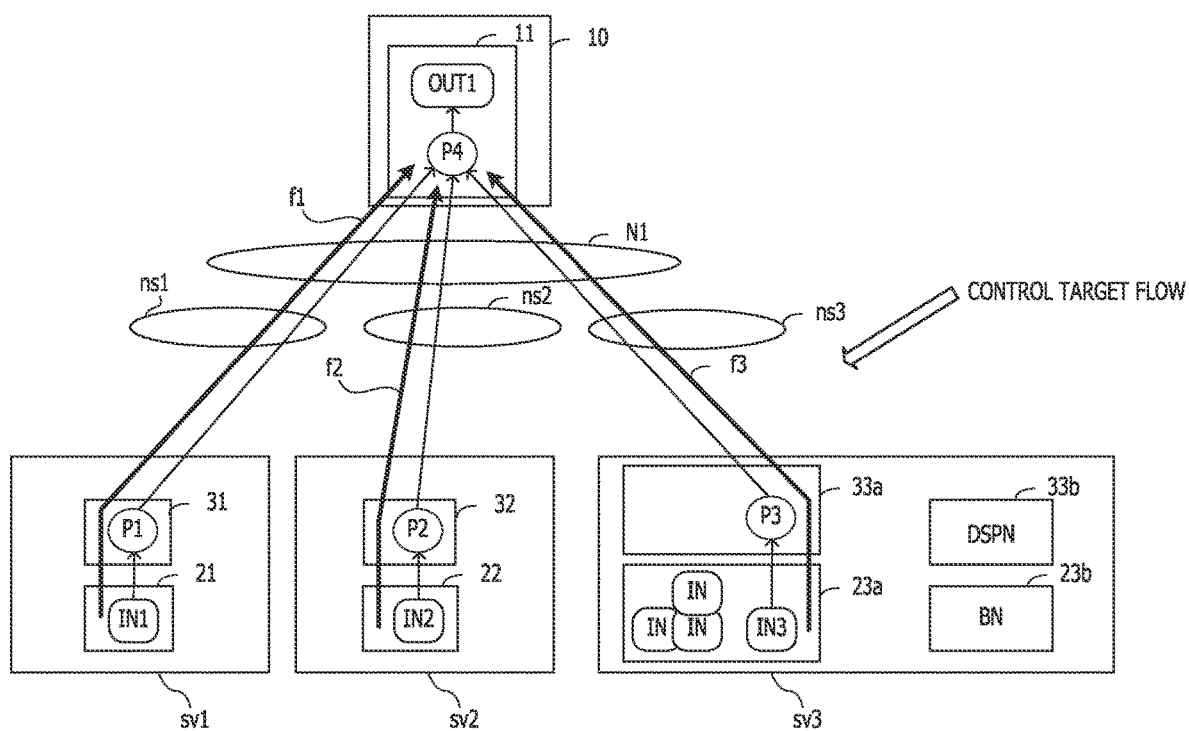
FIG. 29 is a diagram illustrating an example of extraction of a control target flow.

FIG. 29 is a diagram illustrating an example of extraction of the control target flow. The control unit 11 extracts the control target flow from the sub-flows f1, f2, and f3. Assuming that the delay of the sub-flow f1 is 3 s, the delay of the sub-flow f2 is 3 s, and the delay of the sub-flow f3 is 30 s, the sub-flow f3 is extracted as the control target flow having the largest arrival delay difference.

Figure 30:
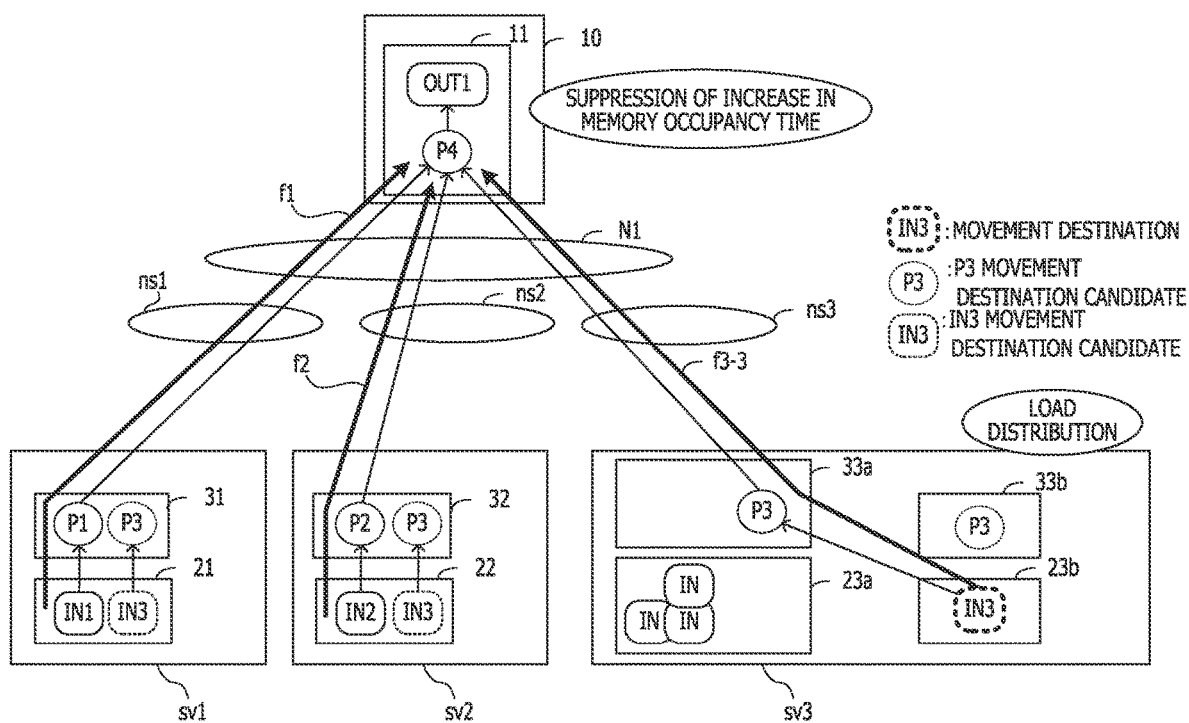
FIG. 30 is a diagram illustrating an example of partition arrangement control.

FIG. 30 is a diagram illustrating an example of partition arrangement control. The control unit 11 searches for the input data IN3 of the partition of the sub-flow f3 and a movement destination of the process P3. Movement destination candidates of the input data IN3 are the BNs 21, 22, and 23b, and movement destination candidates of the process P3 are the DSPNs 31, 32, and 33b.

The control unit 11 selects a movement destination as a solution so that the delay of the sub-flow f3 is about the same as that of the sub-flows f1 and f2, and moves the input data IN3 or the process P3 to the selected movement destination. In the example of FIG. 30, the process P3 is not moved from the DSPN 33a, but the data IN3 is moved from the BN 23a to the BN 23b.

As a result, the delay of the sub-flow f3-1 after the rearrangement is set to 3 s. By such partition arrangement control, a load is distributed in the edge server sv3, and the variation in the arrival times of the sub-flows f1, f2, and f3-3 is reduced, so that the increase in the memory occupancy time may be suppressed.

(When the input data amount on the edge server side is excessive)

When the input data amount on the edge server side is excessive, control for eliminating a state in which the memory occupancy time on the information processing server 10 side increases will be described with reference to FIGS. 31 to 33.

Figure 31:
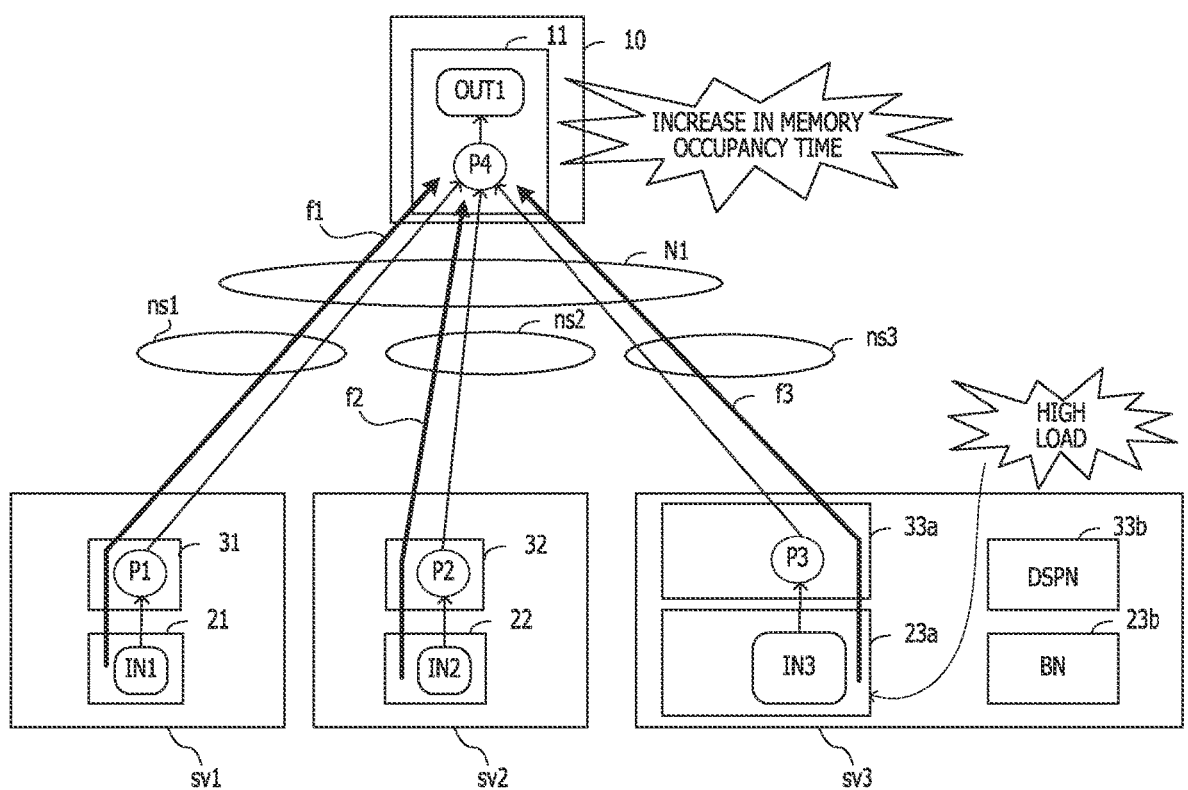
FIG. 31 is a diagram illustrating an example of a state in which the memory occupancy time increases.

FIG. 31 is a diagram illustrating an example of a state in which the memory occupancy time increases. A sub-flow f1 is a data flow in which the data IN1 stored in the BN 21 is input to the process P1 of the DSPN 31 to execute the process P1, and data executed by the process P1 is input to the merging process P4 of the information processing server 10.

A sub-flow f2 is a data flow in which the data IN2 stored in the BN 22 is input to the process P2 of the DSPN 32 to execute the process P2, and data executed by the process P2 is input to the merging process P4 of the information processing server 10.

A sub-flow f3 is a data flow in which the data IN3 stored in the BN 23a is input to the process P3 of the DSPN 33a to execute the process P3, and data executed by the process P3 is input to the merging process P4 of the information processing server 10.

Here, in the BN 23a in the edge server sv3, the data amount of the data IN3 is in an excessive state. In this case, since the BN 23a has a high load, the delay of the sub-flow f3 becomes larger. Therefore, in the merging process P4 in the information processing server 10, data waiting of the sub-flow f3 occurs and the memory occupancy time increases.

Figure 32:
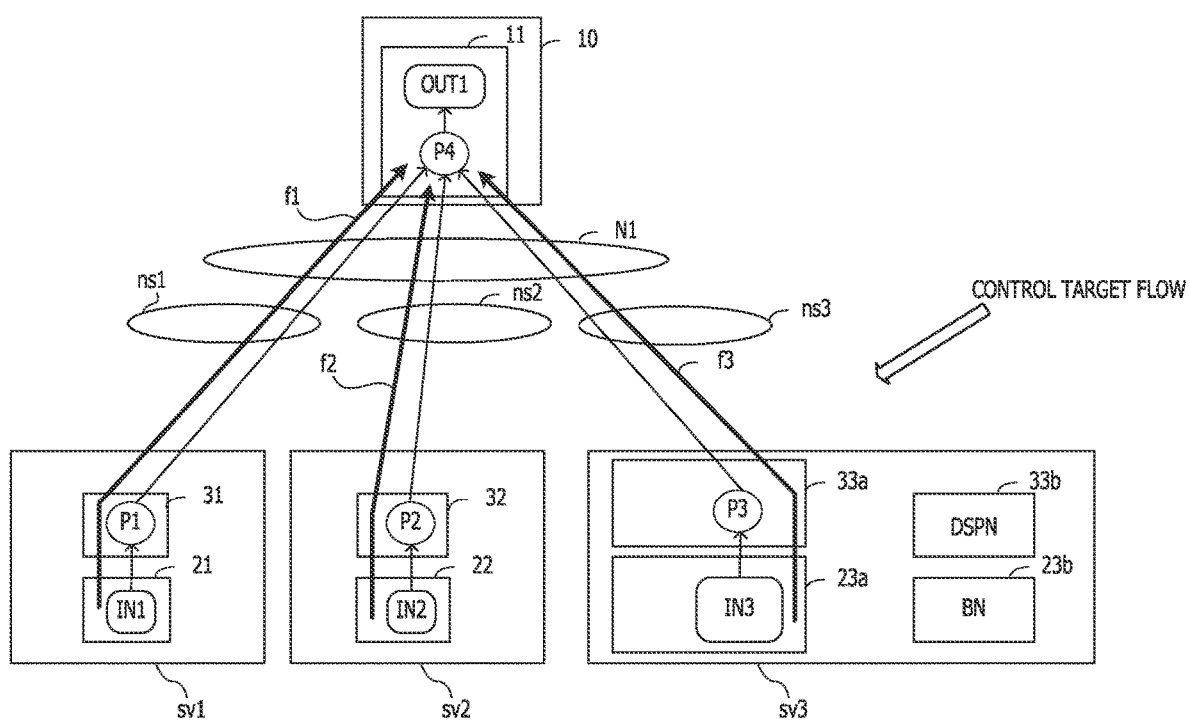
FIG. 32 is a diagram illustrating an example of extraction of a control target flow.

FIG. 32 is a diagram illustrating an example of extraction of the control target flow. The control unit 11 extracts the control target flow from the sub-flows f1, f2, and f3. Assuming that the delay of the sub-flow f1 is 3 s, the delay of the sub-flow f2 is 3 s, and the delay of the sub-flow f3 is 30 s, the sub-flow f3 is extracted as the control target flow having the largest arrival delay difference.

Figure 33:
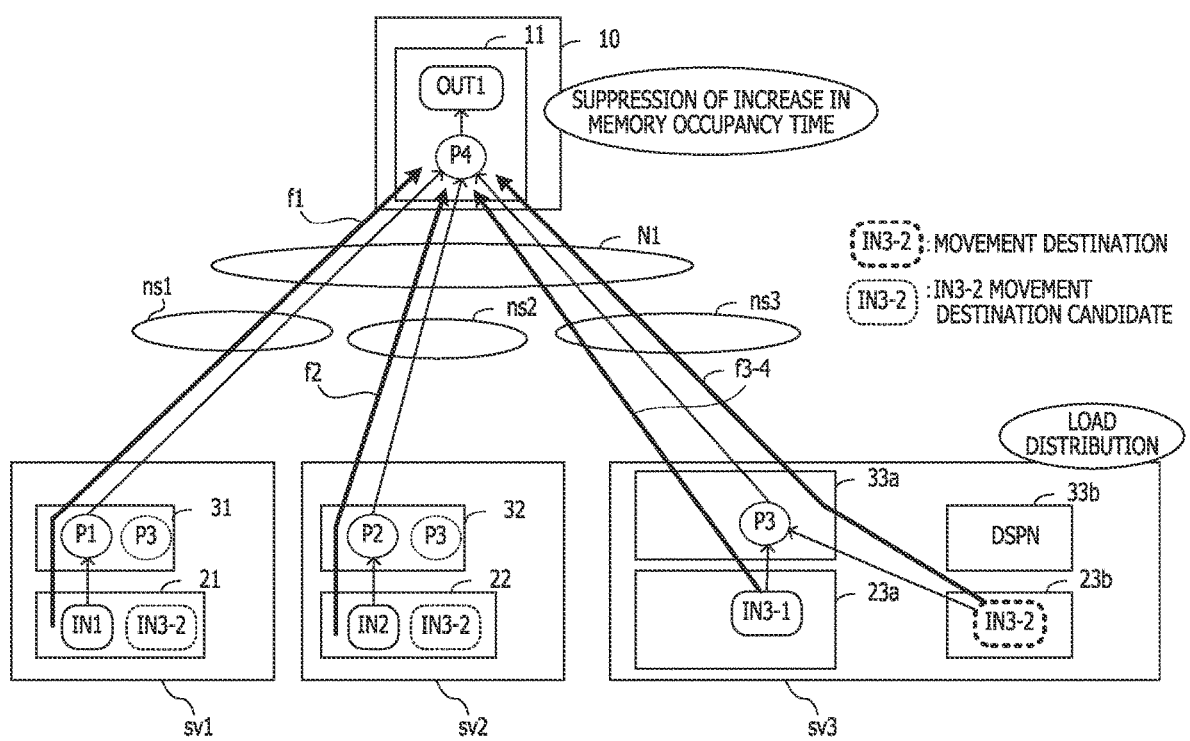
FIG. 33 is a diagram illustrating an example of partition arrangement control.

FIG. 33 is a diagram illustrating an example of partition arrangement control. The control unit 11 divides the data IN3 of the partition of the sub-flow f3 into data IN3-1 and IN3-2 and searches for a movement destination of the data IN3-2 and a movement destination of the process P3.

Movement destination candidates of the process P3 are the DSPNs 31, 32, and 33b, and movement destination candidates of the data IN3-2 are the BNs 21, 22, and 23b. The control unit 11 selects a movement destination as a solution so that the delay of the sub-flow f3 is about the same as that of the sub-flows f1 and f2, and moves the input data IN3-2 and the process P3 to the selected movement destination.

In the example of FIG. 33, the process P3 is not moved from the DSPN 33a, but the data IN3-2 is moved from the BN 23a to the BN 23b. As a result, the delay of the sub-flow f3-4 after the rearrangement is set to 3 s. By such partition arrangement control, a load is distributed in the edge server sv3, and the variation in the arrival times of the sub-flows f1, f2, and f3-4 is reduced, so that the increase in the memory occupancy time may be suppressed.

Third Embodiment

Next, a third embodiment will be described. In the above embodiments, the information processing server 10 located at the upper level of the edge server extracts the control target flow and performs the partition arrangement control.

Meanwhile, in the third embodiment, the BN performance information, the DSPN performance information, the network delay information, etc. are shared with each other by mutual communication between edge servers. Then, a control master is selected from a plurality of edge servers, and the edge server selected as the control master performs the same control as the information processing server 10.

Figure 34:
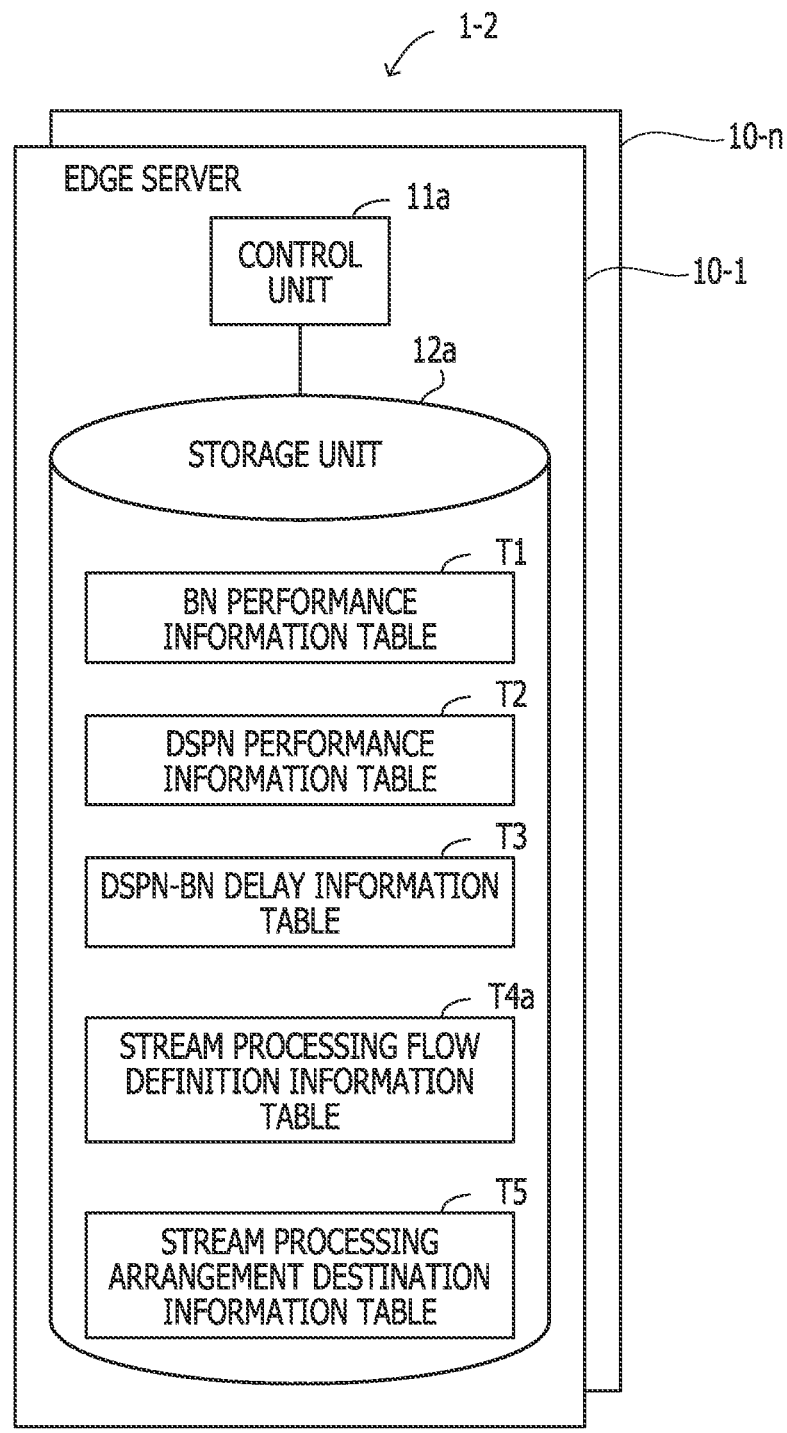
FIG. 34 is a diagram illustrating an example of a functional block of an information processing system.

FIG. 34 is a diagram illustrating an example of a functional block of an information processing system. The information processing system 1-2 of the third embodiment includes edge servers 10-1, . . . , 10-n, and communication is performed between the servers.

The edge server 10-1 includes a control unit 11a and a storage unit 12a. The control unit 11a communicates with other edge servers and performs control to become a control master in the system. When the control unit 11a itself becomes the control master, it performs the same operation as the control unit 11 illustrated in FIG. 6.

The storage unit 12a maintains table structures of a BN performance information table T1, a DSPN performance information table T2, a DSPN-BN delay information table T3, a stream processing flow definition information table T4a, and a stream processing arrangement destination information table T5.

Meanwhile, the stream processing flow definition information table T4a has a different table configuration from the stream processing flow definition information table T4 illustrated in FIG. 11. Other table configurations are the same.

FIG. 35 is a diagram illustrating an example of the stream processing flow definition information table. The stream processing flow definition information table T4a has attributes of a stream processing flow ID, a processing topology, a control master ID, and a control master address. The stream processing flow ID is an ID that identifies a stream processing flow. The processing topology is information indicating the relationship between partitions that make up stream processing.

The control master ID is an ID that identifies an edge server that will become a control master. The control master address is address information for identifying an end point for accessing the control master.

FIG. 36 is a diagram illustrating an example of control master selection information. The control master selection information m6 is a message transmitted from one edge server to the other edge server, and has attributes of a destination address, a source address, a stream processing flow ID, a method, and a parameter (in the figure, an edge server is written as an edge).

The destination address is an address of a destination edge server. The source address is an address of a source edge server. The stream processing flow ID is an ID that identifies a stream processing flow.

The method designates an edge server ID advertisement when the method is "1", a response advertisement when the method is "2", and a control master advertisement when the method is "3". The parameter is an ID of an edge server when the method=1, and an advertisement source edge server ID, a response source edge server ID, and a response (Accept/Decline) when the method=2. When the method=3, the control master ID and the address of a control master edge server are designated.

Figure 37:
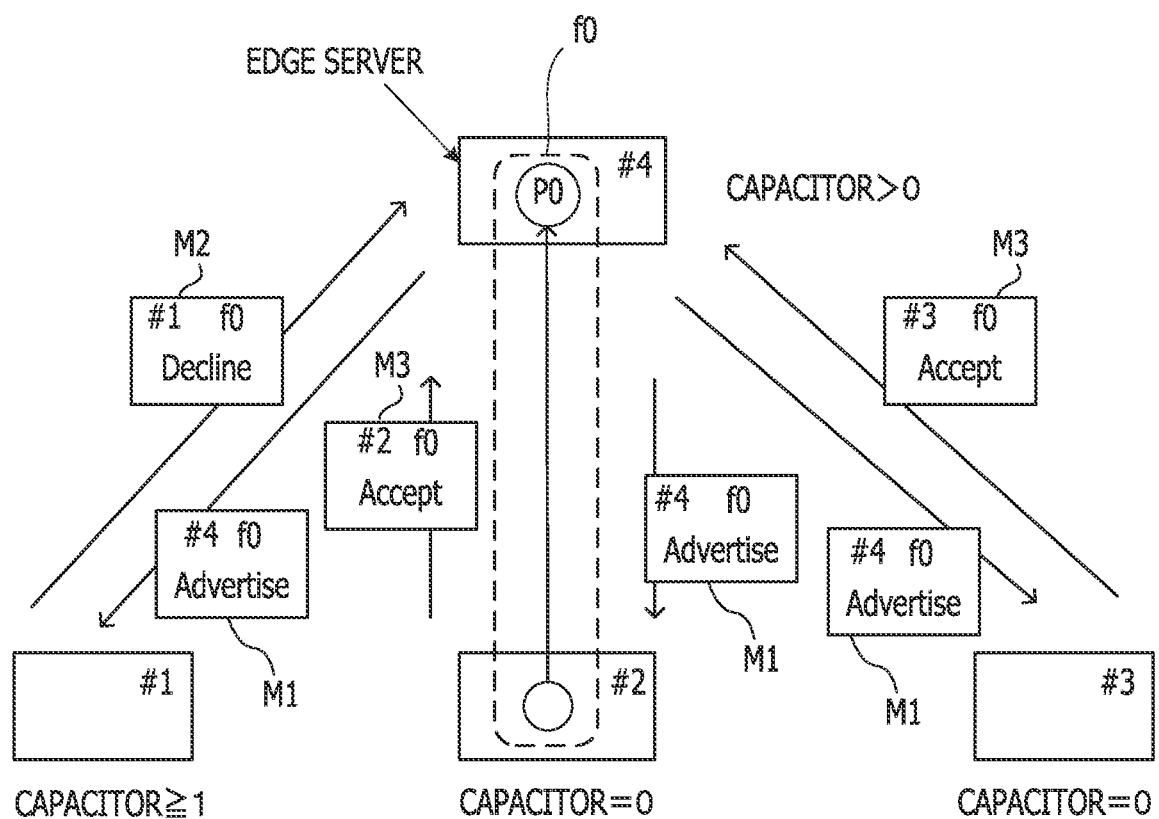
FIG. 37 is a diagram for explaining an example of a control master selection operation.

FIG. 37 is a diagram for explaining an example of selection operation of the control master. As a premise, each edge server has a capacity that may be handled by the control master, as a set value, and may not handle control of the number of flows that exceed the set value of the capacity. In addition, each edge server is assigned an ID that may be compared in size. The ID may be simply assigned a serial number or may be assigned according to the performance.

(1) An edge server #4 to which process P0 in a partition constituting a sub-flow f0 is newly arranged, checks its own capacity. When the capacity exceeds 0, a message including its own ID and a sub-flow ID is broadcast. For example, the edge server #4 broadcasts a message M1 including its own ID=#4 and a sub-flow ID=f0.

(2) An edge server that has received the message returns an "Accept" message when its own capacity is 0. Even when the capacity is 1 or more, when its own ID is larger than the ID described in the message, the "Accept" message is similarly returned. When the capacity is 1 or more and its own ID is smaller than the ID described in the message, a "Decline" message is returned. The "Decline" message is also returned when the "Accept" message is already issued to an edge server with a smaller ID.

Further, when an advertisement is received from an edge with a smaller ID even though it has been accepted once, the "Accept" message is returned to the edge server with a smaller ID, and the "Decline" message is sent to the edge server that has once issued the "Accept" message.

In the example of FIG. 37, an edge server #1 returns a "Decline" message M2 because the capacity is 1 or more and its own ID=#1 is smaller than ID=#4. Since edge servers #2 and #3 have their own capacity of 0, the edge servers return an "Accept" message M3.

(3) When more than half of "Accept" messages including its own "Accept" message are obtained, one of the edge servers #1, #2, #3, and #4 becomes a control master. In this example, among the four edge servers #1, #2, #3, and #4, since the "Accept" message is obtained from the edge servers #2 and #3, the edge server #4 becomes the control master.

(4) When less than half of the "Accepts" messages are obtained, a "Request" message including a sub-flow ID is issued to an edge server having the smallest ID among edge servers that returned the "Decline" message. The edge server that has received the "Request" message starts the same step from (1).

<Flowchart>

Figure 38:
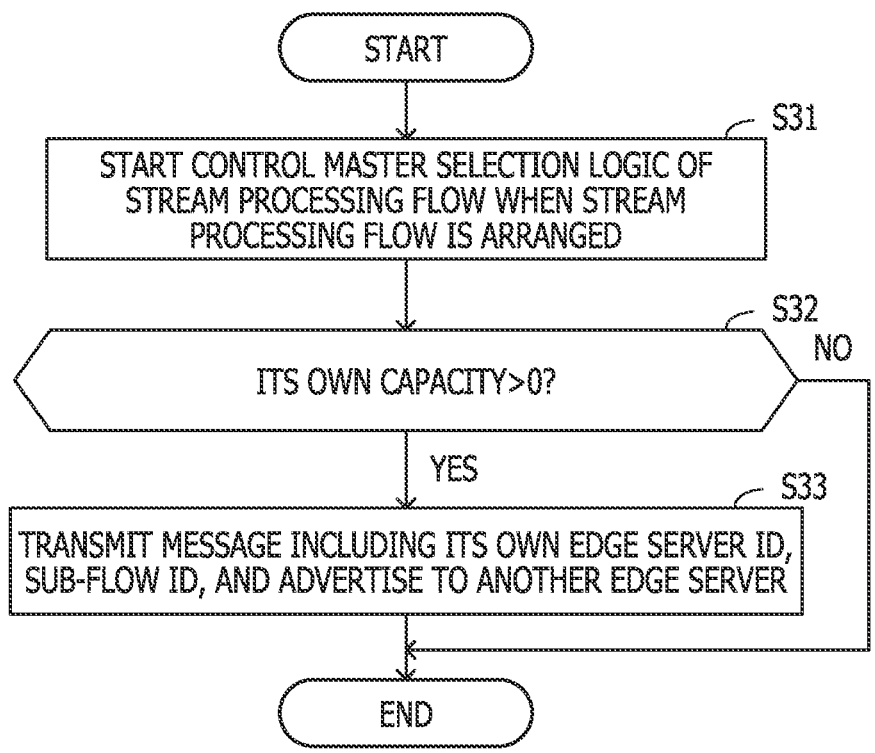
FIG. 38 is a flowchart illustrating an example of an operation at the time of starting a control master selection process.

The control master selection operation will be described with reference to FIGS. 38 to 42. FIG. 38 is a flowchart illustrating an example of an operation at the time of starting a control master selection process.

[Step S31] When a stream processing flow is arranged, the control unit 11a in the edge server starts the control master selection logic of the stream processing flow.

[Step S32] The control unit 11a determines whether its own capacity is greater than 0. When it is determined that its own capacity is greater than 0, the process proceeds to step S33. Otherwise, the process ends.

Figure 39:
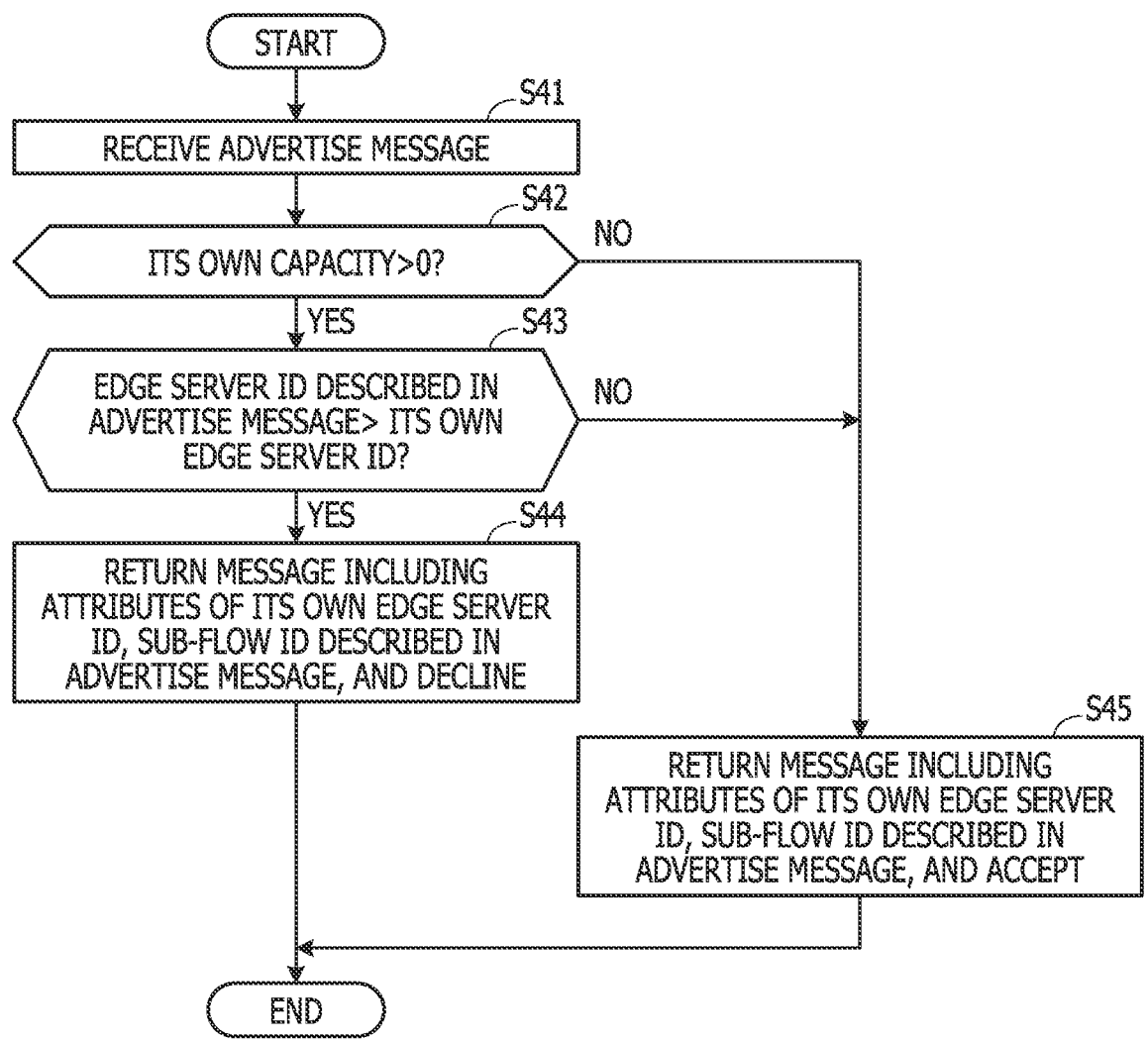
FIG. 39 is a flowchart illustrating an example of an operation when an Advertise message is received.

[Step S33] The control unit 11a transmits an "Advertise" message including the attributes of its own edge server ID, sub-flow ID, and "Advertise" to another edge server. FIG. 39 is a flowchart illustrating an example of an operation when the "Advertise" message is received.

[Step S41] The control unit 11a receives the "Advertise" message.

[Step S42] The control unit 11a determines whether its own capacity is greater than 0. When it is determined that its own capacity is greater than 0, the process proceeds to step S43. Otherwise, the process proceeds to step S45.

[Step S43] The control unit 11a compares the edge server ID described in the "Advertise" message with its own edge server ID. When the edge server ID described in the Advertise message is larger than its own edge server ID, the process proceeds to step S44. Otherwise, the process proceeds to step S45.

[Step S44] The control unit 11a returns a Decline message including attributes of its own edge server ID, sub-flow ID described in the Advertise message, and Decline to a source edge server of the "Advertise" message.

[Step S45] The control unit 11a returns the "Accept" message including the attributes of its own edge server ID, sub-flow ID described in the "Advertise" message, and "Accept" to the source edge server of the "Advertise" message.

Figure 40:
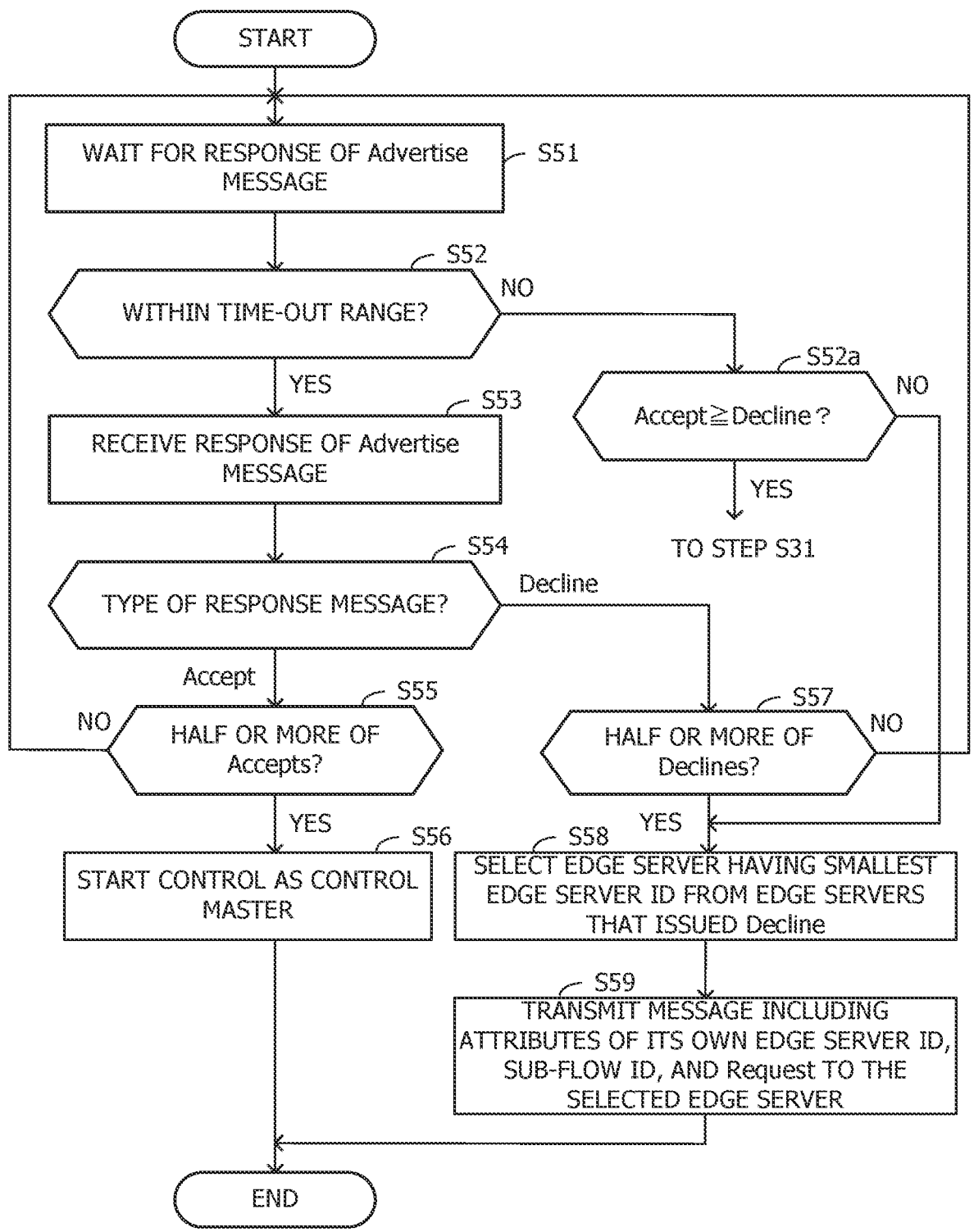
FIG. 40 is a flowchart illustrating an example of an operation when a control master is determined.

FIG. 40 is a flowchart illustrating an example of an operation when the control master is determined.

[Step S51] The control unit 11a of the edge server that has transmitted the "Advertise" message waits for a response of the "Advertise" message.

[Step S52] The control unit 11a determines whether it is within the time-out range after transmitting the "Advertise" message. When it is determined that the control unit 11a is within the time-out range, the process proceeds to step S53. When it is determined that the control unit 11a is outside the time-out range, the process proceeds to step S52a.

[Step S52a] The control unit 11a determines whether the number of "Accept" messages is larger than the number of "Decline" messages. When it is determined that the number of "Accept" messages is larger than the number of "Decline" messages, the process proceeds to step S31. When it is determined that the number of "Accept" messages is smaller than the number of "Decline" messages, the process proceeds to step S58.

[Step S53] The control unit 11a receives a response of the "Advertise" message.

[Step S54] The control unit 11a determines the type of the response message. When it is determined that the response message is the "Accept" message, the process proceeds to step S55. When it is determined that the response message is the "Decline" message, the process proceeds to step S57.

[Step S55] The control unit 11*a* determines whether half or more of the response messages are "Accept" messages. When it is determined that half or more of the response messages are "Accept" messages, the process proceeds to step S56. When it is determined that half or less of the response messages are "Accept" messages, the process returns to step S51.

[Step S56] The control unit 11*a* performs control on the arranged stream processing flow, as a control master.

[Step S57] The control unit 11*a* determines whether half or more of the response messages are "Decline" messages. When it is determined that half or more of the response messages are "Decline" messages, the process proceeds to step S58. When it is determined that half or less of the response messages are "Decline" messages, the process returns to step S51.

[Step S58] The control unit 11*a* selects an edge server having the smallest edge server ID from the edge servers that issued the "Decline" message.

[Step S59] The control unit 11*a* transmits the "Request" message including the attributes of its own edge server ID, sub-flow ID, and "Request" to the edge server selected in step S58.

Figure 41:
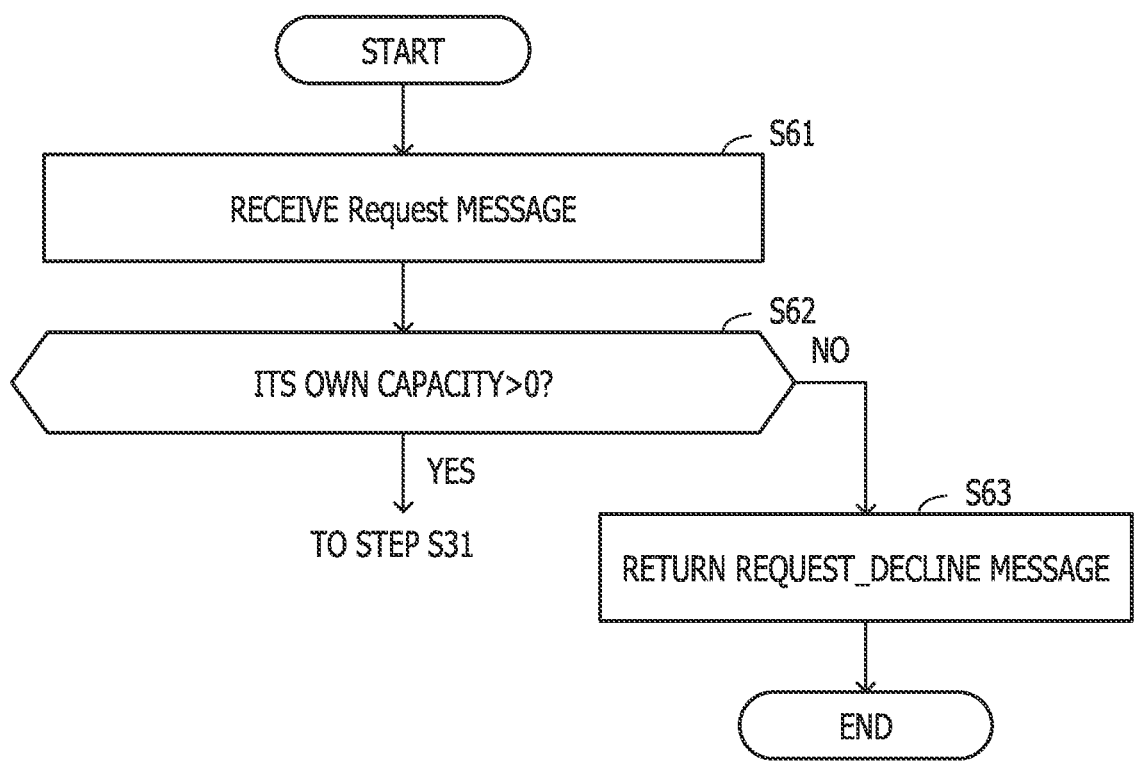
FIG. 41 is a flowchart illustrating an example of an operation of an edge server that has received a Request message.

FIG. 41 is a flowchart illustrating an example of an operation of the edge server that has received the Request message.

[Step S61] The control unit 11*a* receives the "Request" message.

[Step S62] The control unit 11*a* determines whether its own capacity is greater than 0. When it is determined that its own capacity is greater than 0, the process proceeds to step S31. When it is determined that its own capacity is not greater than 0, the process proceeds to step S63.

[Step S63] The control unit 11*a* returns a "Request_Decline" message.

Figure 42:
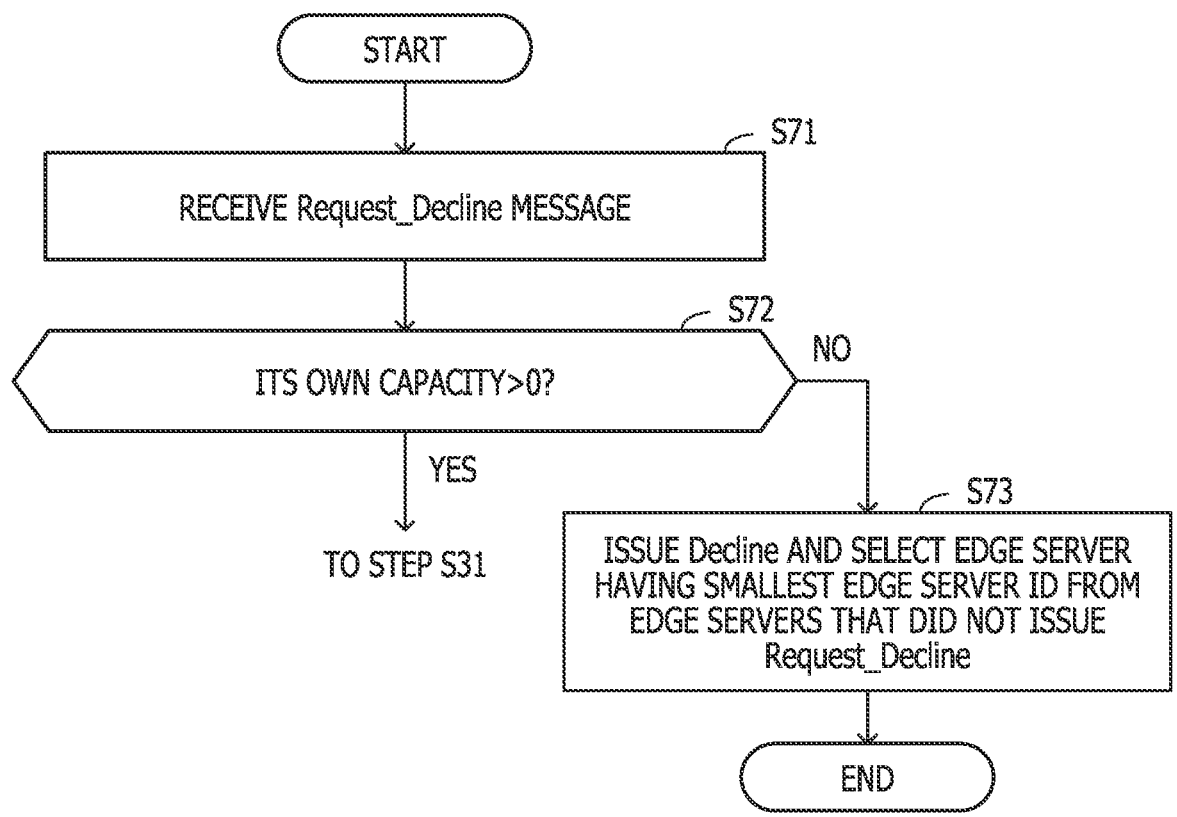
FIG. 42 is a flowchart illustrating an example of an operation of an edge server that has received a Request_Decline message.

FIG. 42 is a flowchart illustrating an example of the operation of an edge server that has received the "Request_Decline" message.

[Step S71] The control unit 11*a* receives the "Request_Decline" message.

[Step S72] The control unit 11*a* determines whether its own capacity is greater than 0. When it is determined that its own capacity is greater than 0, the process proceeds to step S31. When it is determined that its own capacity is not greater than 0, the process proceeds to step S73.

[Step S73] The control unit 11*a* issues a Decline message and selects an edge server having the smallest edge server ID among the edge servers that have not issued the "Request_Decline" message.

As described above, when the partition of the control target data flow is arranged, the message (M1) including at least its own processing capacity is advertised, the data flow is set as a control master when the number of approval messages (M3) returned from each site is larger than a predetermined number, and the rearrangement of the partition of the control target data flow is executed. As a result, autonomous distribution/cooperative control becomes possible among a plurality of edge servers, and it is also possible to perform the partition arrangement control with high efficiency among the plurality of edge servers. In addition, it is also possible to use a consensus building algorithm such as Paxos, Raft, or the like to select the control master.

[Modifications]

In the above embodiments, for example, when the occurrence of network delay is detected, the data IN or the process P is rearranged by the partition arrangement control of sub-flows to a merging point, thereby achieving an operation in the normal state where network delay is reduced.

In contrast, in a modification, redundant data is pre-arranged at a plurality of locations based on delay information. It takes time to move the already accumulated data from one edge server to another, and as a result, it may take time to transition to the normal state. In the modification, the time required to transition to the normal state is shortened by performing control so that the redundant data is pre-arranged at the plurality of locations.

Figure 43:
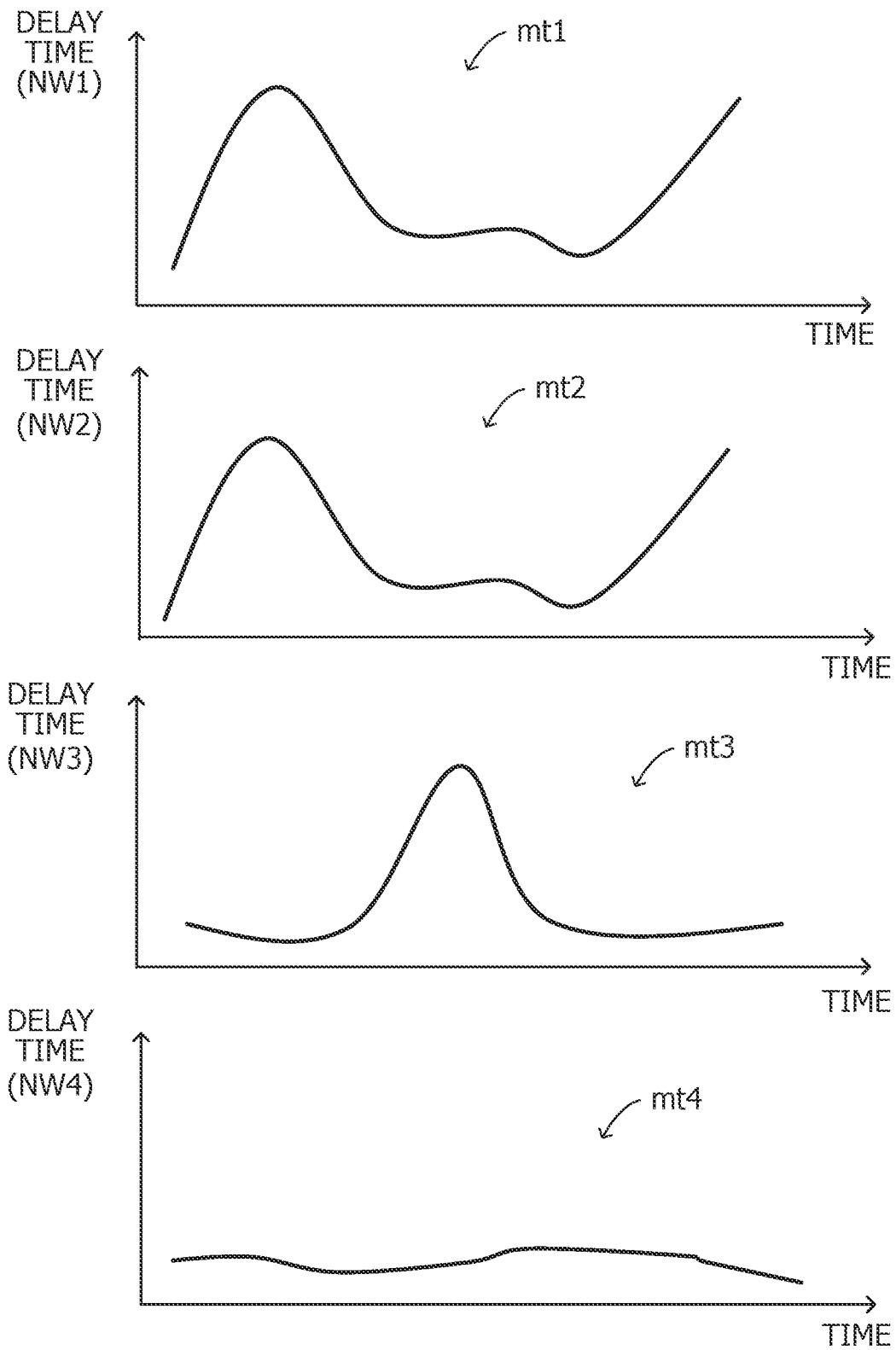
FIG. 43 is a diagram illustrating an example of delay information.

FIG. 43 is a diagram illustrating an example of delay information. As the delay information, network delay metrics (e.g., indexes that process collected data to enable quantitative evaluation) are used. The metrics $mt1, \ldots, mt4$ indicate the time-series changes in delay of networks $nw1, \ldots, Nw4$, respectively. The horizontal axis represents, for example, the time of day. The vertical axis represents the network delay time that occurs at that time.

Figure 44:
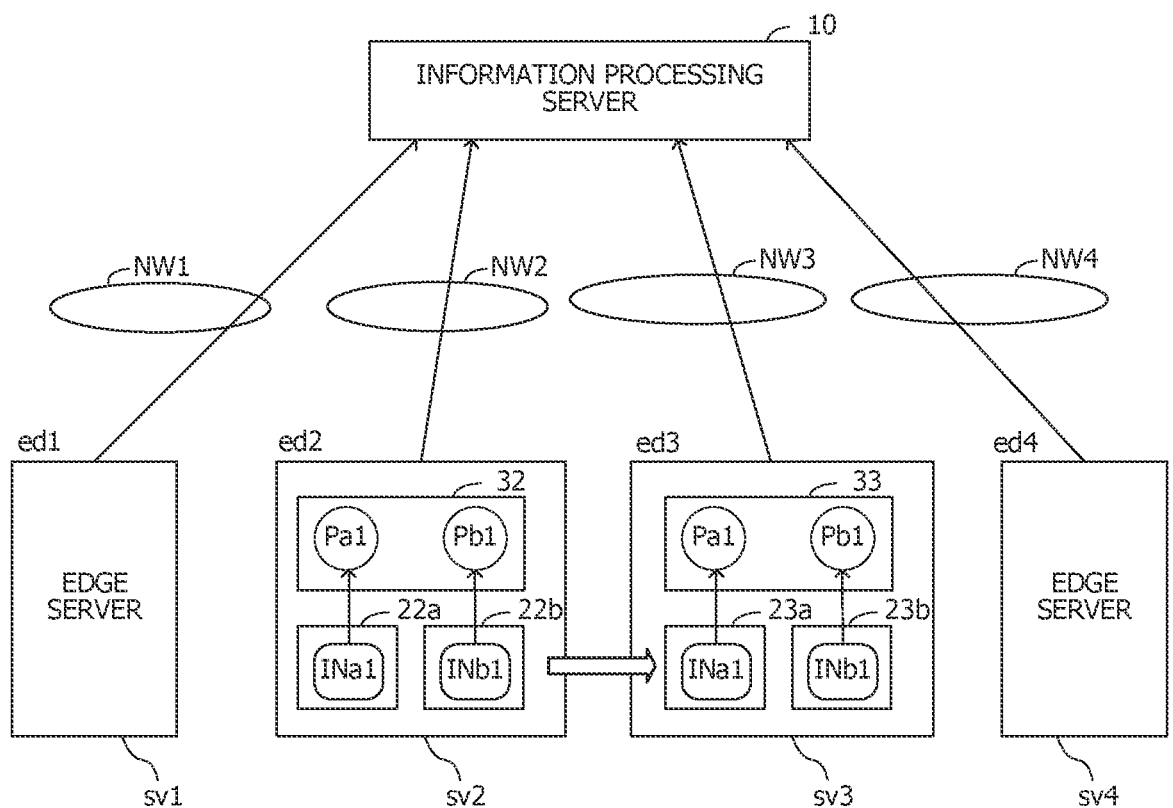
FIG. 44 is a diagram for explaining an example of redundant data arrangement control based on delay information.

FIG. 44 is a diagram for explaining an example of redundant data arrangement control based on the delay information. Edge servers $sv1, \ldots, sv4$ are arranged at edge bases $ed1, \ldots, ed4$, respectively, and an information processing server 10 is arranged in a cloud.

The edge server sv1 is connected to the information processing server 10 via the network NW1, and the edge server sv2 is connected to the information processing server 10 via the network NW2. The edge server sv3 is connected to the information processing server 10 via the network NW3, and the edge server sv4 is connected to the information processing server 10 via the network NW4.

In addition, the edge servers $sv1, \ldots, sv4$ collect and maintain the time-series changes in delay to the information processing server 10, as metrics, from the edge bases $ed1, \ldots, ed4$, respectively. That is, the edge servers $sv1, \ldots, sv4$ maintains the metrics $mt1, \ldots, mt4$ illustrated in FIG. 43, respectively.

It is assumed that data INa1 and INb1 are input to BN 22*a* and 22*b* of the edge server sv2, respectively, and processes Pa1 and Pb1 are performed by a DSPN 32. The control unit 11 detects the mutual similarity between the metrics $mt1, \ldots, mt4$, and when the similarity is equal to or less than a predetermined value, redundant data is arranged at a base having the metrics.

Here, the delay from the edge base ed2 to a merging point is the metric $mt2$, but an edge base whose delay changes with the same tendency as the metric $mt2$ is the edge base ed1 of the metric $mt1$ (the metrics $mt1$ and $mt2$ have high similarity). Therefore, the edge server sv1 of the edge base ed1 is excluded as a redundant data arrangement destination of data placed on the edge server sv2 of the edge base ed2.

This is because even when the data is transferred to the edge server sv1, when the network delay of the edge server sv2 occurs, the delay from the edge server sv1 to the merging point is likely to be delayed as well.

Therefore, candidates for the arrangement destination of the redundant data are the edge server sv3 of the edge base ed3 and the edge server sv4 of the edge base ed4. In the example of FIG. 44, the edge server sv3 is selected, a copy of the data INa1 is pre-arranged in the BN 23*a* in the edge server sv3, and a copy of the data INb1 is pre-arranged in the BN 23*b* in the edge server sv3.

In this way, the control unit 11 maintains the first time-series change ($mt1$) of the delay until the first data flow arrives from the first base to the merging process Point, and the second time-series change ($mt2$) of the delay until the second data flow arrives from the second base to the merging process Point.

Then, when the similarity between the first time-series change (mt1) and the second time-series change (mt2) is equal to or less than a predetermined value, the control unit 11 duplicates the partition forming the first data flow and pre-arranges the duplicated partition at the second base. As a result, since the redundant data is pre-arranged, it is possible to shorten the time until the transition is made to the normal state with the reduced delay time.

<Effects>

Figure 45:
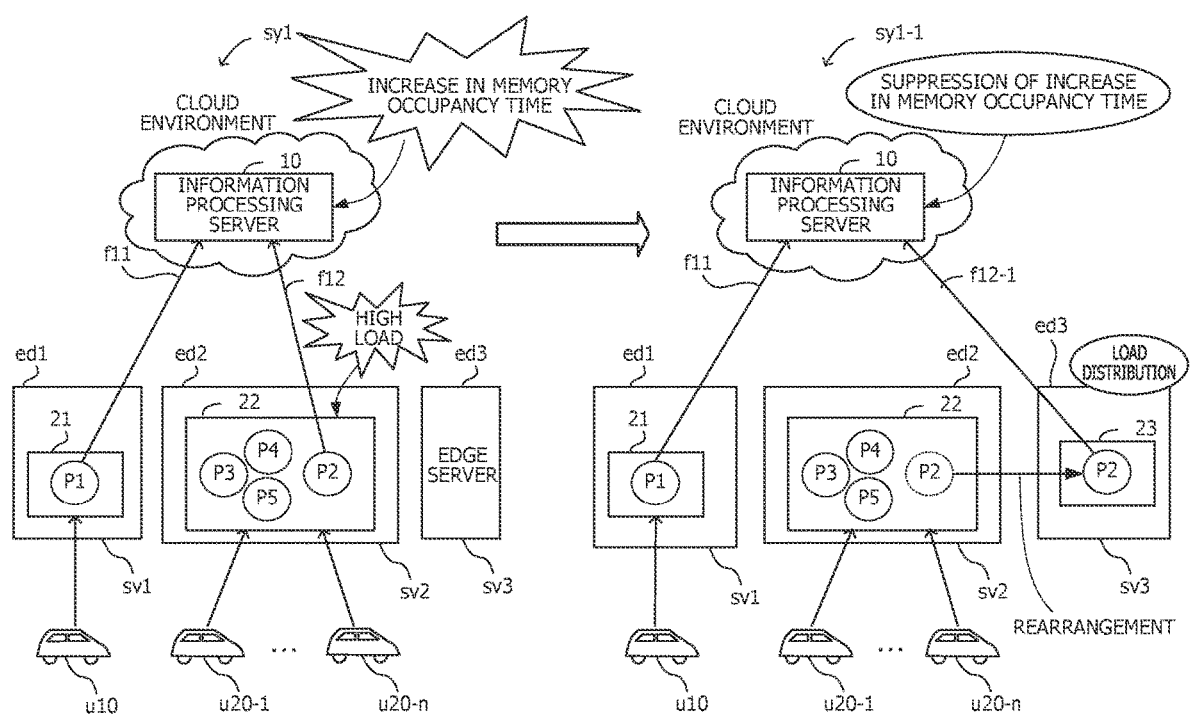
FIG. 45 is a diagram illustrating an example of the effect by partition arrangement control of an information processing server.

FIG. 45 is a diagram illustrating an example of the effect of the partition arrangement control of the information processing server. In a system sy1, the edge server sv1 is arranged at the edge base ed1, the edge server sv2 is arranged at the edge base ed2, and the edge server sv3 is arranged at the edge base ed3. The edge servers sv1, sv2, and sv3 are connected to the information processing server 10 in the cloud environment.

The edge server sv1 receives data transmitted from a user u10, executes the process P1 in a processing unit 21, and transmits a resulting data flow f11 to the information processing server 10. The edge server sv2 receives data transmitted from users u20-1, . . . , u20-$n$, and executes the processes P2, P3, P4, and P5 in a processing unit 22. Further, the processing unit 22 transmits a data flow f12, which is the result of the process P2, to the information processing server 10.

Here, the processing unit 22 in the edge server sv2 is executing the processes P3, P4, and P5 in addition to the process P2, and the processing amount is excessive. In this case, since the processing unit 22 has a high load, the delay of the data flow f12 becomes larger than that of the data flow f11. Therefore, in the data flow merging process in the information processing server 10, data waiting of the data flow f12 occurs, and the memory is occupied until the data flow f12 arrives. Therefore, the memory occupancy time increases.

Accordingly, when the information processing server 10 detects that the delay difference of the data flow f12 is larger than that of the data flow f11 based on the delays of the data flows f11 and f12, the arrangement of the partition that generates the data flow f12 is changed.

In this example, in a system sy1-1, the information processing server 10 transmits to the edge servers sv2 and sv3 an instruction to change arrangement of the process P2, which is the partition of the data flow f12, from the processing unit 22 of the edge server sv2 to a processing unit 23 of the edge server sv3. As a result, load distribution is performed in which the process P2 moves from the edge server sv2 to the edge server sv3, and the process P2 is executed on the edge server sv3 side where the load is small.

Therefore, a data flow f12-1 with the reduced delay difference is transmitted from the edge server sv3 to the information processing server 10. Therefore, since the data flows f11 and f12-1 with reduced variation in arrival time are merged at the information processing server 10, it is possible to suppress an increase in the memory occupancy time.

As described above, according to the present disclosure, in the distribution stream processing, the processing environment of the unit data of the data flow having an arrival delay difference larger than a predetermined value in the data flow group is changed from the current location to another location where the arrival delay difference may be reduced, thereby suppressing the memory occupancy of the merging waiting data.

The processing functions of the information processing apparatus, the information processing server, and the edge server of the present disclosure described above may be implemented by a computer. In this case, a program that describes the processing contents of the functions that the information processing apparatus, the information processing server, and the edge server need to have is provided. By executing the program on the computer, the above processing functions are implemented on the computer.

The program that describes the processing contents may be recorded on a computer-readable recording medium. The computer-readable recording medium includes a magnetic storage unit, an optical disk, an optical-magnetic recording medium, a semiconductor memory, or the like. The magnetic storage unit includes a hard disk device (HDD), a flexible disk (FD), a magnetic tape, or the like. The optical disk includes a CD-ROM/RW or the like. The optical-magnetic recording medium includes an MO (Magneto Optical disk) or the like.

When distributing the program, for example, a portable recording medium such as a CD-ROM on which the program is recorded is sold. It is also possible to store the program in a storage unit of a server computer and transfer the program from the server computer to another computer via a network.

The computer that executes the program stores, for example, the program recorded on the portable recording medium or the program transferred from the server computer in its own storage unit. Then, the computer reads the program from its own storage unit and executes a process according to the program. Meanwhile, the computer may also read the program directly from the portable recording medium and execute the process according to the program.

In addition, the computer may also sequentially execute the process according to the received program each time the program is transferred from the server computer connected via the network. Further, at least a part of the above processing functions may be implemented by an electronic circuit such as a DSP, an ASIC, a PLD, or the like.

Although the embodiments have been illustrated above, the configuration of each unit illustrated in the embodiments may be replaced with another having the same function. Further, any other components or processes may be added. Further, any two or more configurations (features) of the above embodiments may be used in combination.

According to an aspect of the embodiments, an increase in memory occupancy time may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   detecting a target data flow in a data flow group when receiving the data flow group and performing a merging process of the data flow group, the data flow group including a plurality of data flows processed at respective bases, the processed data flows including corresponding, respective delay times, the target data flow being processed at one of the respective bases and having a delay time larger than a predetermined value based on the corresponding, respective delay times of the plurality of data flows; and executing rearrangement of a generation element of the target data flow from a higher-load processing unit in the one of the respective bases to a lower-load processing unit in the one of the respective bases such that differences between the corresponding, respective delay times of the plurality of data flows are reduced.

2. The non-transitory computer-readable recording medium according to claim 1, wherein the generation element is input data related to generation of the target data flow, or processing unit data partitioned when data is processed.

3. The non-transitory computer-readable recording medium according to claim 1, the process further comprising:

executing the rearrangement of the generation element from a first location in which the generation element is currently arranged to a second location different from the first location or from a first base to a second base different from the first base, the first location and the second location being within the first base.

4. The non-transitory computer-readable recording medium according to claim 3, the process further comprising:

detecting a first maximum delay time and a first minimum delay time among delay times of the plurality of data flows in a case where the generation element is arranged in a first candidate for the second location;

obtaining a first difference between the first maximum delay time and the first minimum delay time;

detecting a second maximum delay time and a second minimum delay time among delay times of the plurality of data flows in a case where the generation element is arranged in a second candidate for the second location, the second candidate being different from the first candidate;

obtaining a second difference between the second maximum delay time and the second minimum delay time;

determining the first candidate as the second location when the first difference is smaller than the second difference; and determining the second candidate as the second location when the second difference is smaller than the first difference.

5. The non-transitory computer-readable recording medium according to claim 4, the process further comprising:

performing a process of data flows arriving within a range of a first time window before the rearrangement is executed;

generating a second time window by adding a smaller value of the first difference and the second difference to the first time window; and performing the process of data flows arriving within a range of the second time window after the rearrangement is executed.

6. The non-transitory computer-readable recording medium according to claim 1, the process further comprising:

calculating an average delay time by averaging delay times of the plurality of data flows; and detecting, as the target data flow, a data flow having a delay time having a largest difference with respect to the average delay time among the plurality of data flows.

7. The non-transitory computer-readable recording medium according to claim 6, the process further comprising:

detecting a maximum delay time and a minimum delay time among delay times of the plurality of data flows;

obtaining a first difference between the maximum delay time and the average delay time;

obtaining a second difference between the minimum delay time and the average delay time;

detecting, as the target data flow, a data flow having the maximum delay time when the first difference is larger than the second difference; and detecting, as the target data flow, a data flow having the minimum delay time when the second difference is larger than the first difference.

8. The non-transitory computer-readable recording medium according to claim 1, the process further comprising:

advertising a message including at least an own processing capacity; and executing the rearrangement when a number of approval messages returned from the respective bases is equal to or larger than a predetermined number.

9. The non-transitory computer-readable recording medium according to claim 1, the process further comprising:

maintaining a first time-series change in a delay time of a first data flow from a first base and a second time-series change in a delay time of a second data flow from a second base; and duplicating a generation element of the first data flow when a similarity between the first time-series change and the second time-series change is equal to or less than a predetermined value; and arranging the duplicated generation element at the second base.

10. An information processing apparatus, comprising:

a memory; and a processor coupled to the memory and the processor configured to:

detect a target data flow in a data flow group when receiving the data flow group and performing a merging process of the data flow group, the data flow group including a plurality of data flows processed at respective bases, the processed data flows including corresponding, respective delay times, the target data flow being processed at one of the respective bases and having a delay time larger than a predetermined value based on the corresponding, respective delay times of the plurality of data flows; and execute rearrangement of a generation element of the target data flow from a higher-load processing unit in the one of the respective bases to a lower-load processing unit in the one of the respective bases such that differences between the corresponding, respective delay times of the plurality of data flows are reduced.

11. An information processing method, comprising:

detecting, by a computer, a target data flow in a data flow group when receiving the data flow group and performing a merging process of the data flow group, the data flow group including a plurality of data flows processed at respective bases, the processed data flows including corresponding, respective delay times, the target data flow being processed at one of the respective bases and having a delay time larger than a predetermined value based on the corresponding, respective delay times of the plurality of data flows; and executing rearrangement of a generation element of the target data flow from a higher-load processing unit in the one of the respective bases to a lower-load processing unit in the one of the respective bases such that differences between the corresponding, respective delay times of the plurality of data flows are reduced.

\* \* \* \* \*